United States Patent
Verschuur

(10) Patent No.: US 8,098,054 B2
(45) Date of Patent: Jan. 17, 2012

(54) OPTIMAL LOAD CONTROLLER METHOD AND DEVICE

(76) Inventor: John Alexander Verschuur, Denver, CO (US)

(*) Notice: Subject to any disclaimer, the term of this patent is extended or adjusted under 35 U.S.C. 154(b) by 606 days.

(21) Appl. No.: 11/973,940

(22) Filed: Oct. 10, 2007

(65) Prior Publication Data

US 2009/0096431 A1    Apr. 16, 2009

(51) Int. Cl.
*H02P 11/00* (2006.01)
*H02P 9/00* (2006.01)
*H02H 7/06* (2006.01)

(52) U.S. Cl. ............................... 322/24; 322/28
(58) Field of Classification Search .................. 322/24, 322/28
See application file for complete search history.

(56) References Cited

U.S. PATENT DOCUMENTS

| | | | |
|---|---|---|---|
| 3,670,594 A | 6/1972 | Roper | 475/211 |
| 3,824,624 A * | 7/1974 | Carlson et al. | 708/3 |
| 3,825,732 A * | 7/1974 | Haley et al. | 703/18 |
| 3,826,906 A * | 7/1974 | Carlson et al. | 703/18 |
| 3,829,667 A * | 8/1974 | Carlson et al. | 703/18 |
| 3,829,669 A * | 8/1974 | Haley et al. | 703/18 |
| 3,832,533 A * | 8/1974 | Carlson et al. | 703/3 |
| 3,832,534 A * | 8/1974 | Carlson et al. | 703/18 |
| 3,833,927 A * | 9/1974 | Carlson et al. | 708/3 |
| 3,857,027 A * | 12/1974 | Carlson et al. | 703/18 |
| 3,863,270 A * | 1/1975 | Haley et al. | 708/3 |
| 4,358,929 A | 11/1982 | Molivadas | 60/641.8 |
| 4,402,237 A | 9/1983 | Tomlinson | 475/205 |
| 4,450,398 A | 5/1984 | Bose | 318/803 |
| 4,468,569 A | 8/1984 | Norris | 290/1 R |
| 4,494,180 A | 1/1985 | Streater | 363/37 |
| 4,537,094 A * | 8/1985 | Bursa et al. | 475/168 |
| 4,542,664 A * | 9/1985 | Sladek et al. | 475/168 |
| 4,887,689 A | 12/1989 | Naito | 180/233 |
| 4,991,429 A | 2/1991 | Stacey | 73/4.59 |
| 5,011,458 A | 4/1991 | Kumm | 474/49 |
| 5,060,747 A | 10/1991 | Eto | 180/197 |
| 5,092,824 A | 3/1992 | Connett | 475/72 |
| 5,117,931 A * | 6/1992 | Nishida | 180/65.25 |
| 5,218,277 A | 6/1993 | Pattison | 318/135 |
| 5,262,717 A | 11/1993 | Bolegoh | 324/772 |
| 5,272,429 A | 12/1993 | Lipo et al. | 318/808 |
| 5,332,959 A * | 7/1994 | Malmquist et al. | 322/14 |
| 5,431,602 A | 7/1995 | Hendriks | 474/28 |
| 5,505,267 A | 4/1996 | Orbach | 172/3 |
| 5,566,774 A * | 10/1996 | Yoshida | 180/65.245 |
| 5,574,643 A | 11/1996 | Yesel | 701/88 |

(Continued)

OTHER PUBLICATIONS

Woodward, easYgen-3000 Genset Control for Multiple Unit Operation.

(Continued)

*Primary Examiner* — Pedro J Cuevas

(57) ABSTRACT

A method and device for optimizing power output of a power generation system having a load engaging system, a load optimizing system, a load selection system, a motive driver and one or more loads or power transfer parameters. The power generation system is illustrated using an electrical generator to consume system power out, however the load(s) may be other than an electrical generator. The load engaging system decides when and how the load or power transfer parameters are applied to and removed from the system. The load selection system enables multiple power transfer parameters to be optimized by selecting and isolating one power transfer parameter at a time to be optimized. The load optimizing system optimizes system power output by manipulating the selected power transfer parameter, dynamically in response to change in power output.

27 Claims, 9 Drawing Sheets

U.S. PATENT DOCUMENTS

| | | | | |
|---|---|---|---|---|
| 5,654,883 | A | 8/1997 | Takehara | 363/79 |
| 5,781,743 | A * | 7/1998 | Matsuno et al. | 709/228 |
| 5,801,519 | A | 9/1998 | Midya | 323/222 |
| 5,802,489 | A | 9/1998 | Orbach | 701/50 |
| 5,860,106 | A * | 1/1999 | Domen et al. | 713/324 |
| 6,067,482 | A * | 5/2000 | Shapiro | 700/286 |
| 6,086,628 | A * | 7/2000 | Dave et al. | 716/105 |
| 6,111,391 | A | 8/2000 | Cullen | 323/223 |
| 6,131,748 | A | 10/2000 | Kawasaki | 211/54.1 |
| 6,175,785 | B1 * | 1/2001 | Fujisawa et al. | 701/22 |
| 6,181,985 | B1 * | 1/2001 | O'Donnell et al. | 700/295 |
| 6,215,198 | B1 * | 4/2001 | Inada et al. | 290/40 C |
| 6,275,969 | B1 * | 8/2001 | Lakshminarayana et al. | 716/133 |
| 6,308,313 | B1 * | 10/2001 | Lakshminarayana et al. | 716/104 |
| 6,346,797 | B1 | 2/2002 | Perreault | 322/29 |
| 6,433,504 | B1 | 8/2002 | Branecky | 318/727 |
| 6,578,176 | B1 * | 6/2003 | Wang et al. | 716/133 |
| 6,583,521 | B1 * | 6/2003 | Lagod et al. | 307/70 |
| 6,597,976 | B2 | 7/2003 | Reuschel | 701/51 |
| 6,658,634 | B1 * | 12/2003 | Goodnow et al. | 716/103 |
| 6,671,195 | B2 | 12/2003 | Perreault | 363/89 |
| 6,864,648 | B1 | 3/2005 | Stedman | 318/148 |
| 6,871,495 | B2 | 3/2005 | Lynch | 60/522 |
| 6,900,997 | B2 | 5/2005 | Perreault | 363/127 |
| 6,971,969 | B2 * | 12/2005 | Kitagawa et al. | 477/3 |
| 6,979,911 | B2 | 12/2005 | Otting | 290/1 R |
| 7,076,350 | B2 * | 7/2006 | Ivarez-Troncoso et al. | 701/36 |
| 7,109,596 | B2 * | 9/2006 | Shimizu | 290/40 C |
| 7,115,066 | B1 * | 10/2006 | Lee | 477/15 |
| 7,123,829 | B2 * | 10/2006 | Ohsuga | 396/301 |
| 7,129,594 | B2 * | 10/2006 | Iwatani et al. | 290/40 C |
| 7,146,256 | B2 * | 12/2006 | Hibi et al. | 700/286 |
| 7,196,497 | B2 * | 3/2007 | Ooiwa | 322/22 |
| 7,208,908 | B2 * | 4/2007 | Anghel | 318/400.02 |
| 7,294,991 | B2 * | 11/2007 | Kimura et al. | 322/37 |
| 7,304,455 | B2 * | 12/2007 | Okahara et al. | 322/28 |
| 7,313,708 | B2 * | 12/2007 | Oshins et al. | 713/300 |
| 7,340,330 | B2 * | 3/2008 | Okoshi et al. | 701/22 |
| 7,343,751 | B2 | 3/2008 | Kates | 62/129 |
| 7,347,184 | B2 * | 3/2008 | Kuroda et al. | 123/434 |
| 7,368,893 | B2 * | 5/2008 | Tsuzuki | 322/28 |
| 7,375,500 | B2 * | 5/2008 | Umeda et al. | 322/29 |
| 7,407,118 | B2 | 8/2008 | Sevy | 239/347 |
| 7,459,801 | B2 * | 12/2008 | Shimoyama et al. | 290/40 B |
| 7,473,206 | B2 * | 1/2009 | Obayashi et al. | 477/107 |
| 7,528,585 | B2 * | 5/2009 | Maehara | 322/59 |
| 7,569,944 | B2 * | 8/2009 | Oohara et al. | 290/44 |
| 7,571,712 | B2 * | 8/2009 | Kuroda et al. | 123/434 |
| 7,577,856 | B2 * | 8/2009 | Oshins et al. | 713/300 |
| 7,615,881 | B2 * | 11/2009 | Halsey et al. | 290/52 |
| 7,634,803 | B2 * | 12/2009 | Birk et al. | 726/8 |
| 7,659,637 | B2 * | 2/2010 | Ichinose et al. | 290/55 |
| 7,694,160 | B2 * | 4/2010 | Esliger et al. | 713/320 |
| 7,710,068 | B2 * | 5/2010 | Tani et al. | 320/104 |
| 2002/0047690 | A1 * | 4/2002 | Okamoto et al. | 322/14 |
| 2002/0060551 | A1 * | 5/2002 | Ikeda | 320/104 |
| 2002/0089312 | A1 * | 7/2002 | Taniguchi et al. | 322/28 |
| 2002/0158610 | A1 * | 10/2002 | Taniguchi et al. | 322/28 |
| 2002/0190695 | A1 * | 12/2002 | Wall et al. | 322/17 |
| 2004/0079557 | A1 * | 4/2004 | Saxon et al. | 177/136 |
| 2004/0133314 | A1 | 7/2004 | Ehlers | 700/276 |
| 2004/0145186 | A1 * | 7/2004 | Inokuchi et al. | 290/40 C |
| 2004/0180754 | A1 * | 9/2004 | Kitagawa et al. | 477/110 |
| 2004/0199799 | A1 * | 10/2004 | Flynn | 713/300 |
| 2005/0062879 | A1 * | 3/2005 | Ohsuga | 348/372 |
| 2005/0128659 | A1 * | 6/2005 | Hibi et al. | 361/20 |
| 2005/0136311 | A1 * | 6/2005 | Ueda et al. | 429/30 |
| 2005/0137764 | A1 * | 6/2005 | Alvarez-Troncoso et al. | 701/36 |
| 2005/0246556 | A1 * | 11/2005 | Oshins et al. | 713/300 |
| 2005/0246559 | A1 * | 11/2005 | Oshins et al. | 713/300 |
| 2005/0246560 | A1 * | 11/2005 | Oshins et al. | 713/300 |
| 2005/0246719 | A1 * | 11/2005 | Oshins et al. | 719/318 |
| 2005/0251293 | A1 | 11/2005 | Seigel | 700/276 |
| 2005/0280400 | A1 * | 12/2005 | Ooiwa | 322/28 |
| 2006/0032379 | A1 | 2/2006 | Kates | 96/417 |
| 2006/0036349 | A1 | 2/2006 | Kates | 700/276 |
| 2006/0139012 | A1 * | 6/2006 | Iwatani et al. | 322/28 |
| 2006/0192533 | A1 * | 8/2006 | Kimura et al. | 322/22 |
| 2006/0214644 | A1 * | 9/2006 | Okahara et al. | 322/23 |
| 2007/0021267 | A1 * | 1/2007 | Obayashi et al. | 477/107 |
| 2007/0024248 | A1 * | 2/2007 | Umeda et al. | 322/37 |
| 2007/0052243 | A1 * | 3/2007 | Shimoyama et al. | 290/40 B |
| 2007/0057648 | A1 * | 3/2007 | Tsuzuki | 322/28 |
| 2007/0080007 | A1 * | 4/2007 | Teramoto et al. | 180/65.3 |
| 2007/0106451 | A1 * | 5/2007 | Kuroda et al. | 701/103 |
| 2007/0247119 | A1 * | 10/2007 | Maehara | 322/28 |
| 2008/0001411 | A1 * | 1/2008 | Ichinose et al. | 290/55 |
| 2008/0059921 | A1 * | 3/2008 | Esliger et al. | 716/4 |
| 2008/0091629 | A1 * | 4/2008 | Matsumoto et al. | 706/14 |
| 2008/0098410 | A1 * | 4/2008 | Oshins et al. | 719/321 |
| 2008/0133077 | A1 * | 6/2008 | Akaki et al. | 701/22 |
| 2008/0148726 | A1 * | 6/2008 | Halsey et al. | 60/538 |
| 2008/0277938 | A1 * | 11/2008 | Oohara et al. | 290/44 |
| 2008/0310069 | A1 * | 12/2008 | Divan et al. | 361/93.9 |
| 2009/0012916 | A1 * | 1/2009 | Barnett | 705/412 |
| 2009/0021011 | A1 * | 1/2009 | Shifrin et al. | 290/43 |
| 2009/0102437 | A1 * | 4/2009 | Nakagawa | 323/217 |
| 2009/0119233 | A1 * | 5/2009 | Dunagan et al. | 705/412 |
| 2009/0206607 | A1 * | 8/2009 | Nakamura et al. | 290/44 |
| 2009/0218889 | A1 * | 9/2009 | Kouwa | 307/84 |
| 2009/0233766 | A1 * | 9/2009 | Kadota | 477/176 |
| 2009/0251110 | A1 * | 10/2009 | Uematsu | 322/18 |
| 2009/0261589 | A1 * | 10/2009 | Oohara et al. | 290/44 |
| 2009/0261599 | A1 * | 10/2009 | Alston et al. | 290/40 B |
| 2010/0013243 | A1 * | 1/2010 | Halsey et al. | 290/40 A |
| 2010/0032142 | A1 * | 2/2010 | Copeland et al. | 165/104.33 |
| 2010/0038969 | A1 * | 2/2010 | Hu et al. | 307/84 |
| 2010/0072958 | A1 * | 3/2010 | Wada et al. | 322/22 |
| 2010/0094490 | A1 * | 4/2010 | Alston et al. | 701/21 |
| 2010/0134056 | A1 * | 6/2010 | Yamamoto et al. | 318/400.15 |
| 2010/0153758 | A1 * | 6/2010 | Esliger et al. | 713/320 |
| 2010/0194469 | A1 * | 8/2010 | Amrutur et al. | 327/538 |
| 2011/0135017 | A1 * | 6/2011 | Tu | 375/259 |

OTHER PUBLICATIONS

Woodward, Easygen 300 Genset Control for Auto Start and Transfer Switch Operation (Model "320/350").

Woodward, Easygen 1000 Genset Control for Single Unit Operation.

Patent Cooperation Treaty, "Written Opinion of the International Searching Authority".

Patent Cooperation Treaty, "Patent Cooperation Treaty PCT International Search Report".

* cited by examiner

RPM/Speed Actuated Generator/Alternator

Conventional Generator/Alternator

OPTIMAL LOAD CONTROLLER METHOD AND DEVICE

COPYRIGHT NOTICE

A portion of the disclosure of this document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever. 37 CFR 1.71(d).

CROSS-REFERENCE TO RELATED APPLICATIONS

N/A

STATEMENT REGARDING FEDERALLY FUNDED RESEARCH

This invention was not made under contract with an agency of the US Government, nor by any agency of the US Government.

FIELD OF THE INVENTION

This invention relates to power generator systems, and specifically to optimizing system power output by varying system parameters that influence the generation of power.

BACKGROUND OF THE INVENTION

Optimization of systems, which generate electricity or other forms of energy, is normally at most a one-time design issue. In general, the power transfer of the system is calculated once, at the time of design, or even never, and then it is assumed that the system will be operated at designed specifications thereafter.

An example of such a system is a vehicular engine and alternator combination. The alternator device acts as a load and generates power in the form of electricity from the mechanical power provided by the engine. (One could trace the source of power back another step: the mechanical power that is available is dependent upon the rate at which hydrocarbons are combusted).

Energy is defined as the ability to do work and is a conserved quantity. Work can be defined as a force that acts through a distance. Work can be conceptualized as energy consumed. Power is the rate at which work is consumed.

From an engineering perspective, work performed, in most cases, refers to useful work. The rate at which useful work is performed is expressed mathematically as:

power=work/time

Efficiency can be thought of as a measurement of how much of the available energy was actually consumed to do useful work. Another way to conceptualize efficiency is:

efficiency=power available for useful work/power provided

In the combustion engine alternator electrical power generating system, mechanical power is converted into electrical power that is consumed by various electrical loads in the vehicle. However only a portion of the mechanical power that was provided is converted to electrical power, to be used in a specific manner. The power losses can mostly be accounted for as heat losses caused by friction in the conversion process from one form of power to another.

There are many factors that affect the efficiency with which power is converted from one form to another: such as from mechanical power to electrical power. For example: the typical automobile alternator is designed to run efficiently between 2 to 4 thousand revolutions per minute. An application, such as a racing engine, may have the alternator running outside of its intended range of 2 to 4 thousand RPM, causing unattractive power losses. It is desirable to increase the efficiency of such devices.

Typical fixed-installation power generation facilities such as solar plants, windmills and electrical generators of all types have similar problems. A great deal of ingenuity goes into designing the motive power source (for example, the blades of a windmill or the thermodynamic properties of an active "wet" solar panels system) so as to derive the maximum power from the source whether it is solar, mechanical or chemical or combinations of these sources including engines of all types. Usually these schemes involve viewing the source of power (the car engine, the windmill, etc) as the component to be optimized, while the electricity-generating device (or device converting one form of power to another form of power) is designed separately or later. When an average value for the power generation source is found, in terms of RPM or other valid metrics of power generation, then an electricity generating device of appropriate size and design RPM is attached as the load on the power source and allowed to run, regardless of power variations in the source, components wearing, or variations in other system parameters that ultimately affect the effectiveness of the power generation system.

The efficiency by which power is transferred from the power source to the load is influenced by loading and other power transfer considerations that affect the efficiency of system power output.

FIG. 1 is a simplified chart that illustrates generated power versus force (load, torque, counter torque) applied by the load in a typical power generating scenario where the input mechanical power is an engine with the "throttle" position set in a constant position that drives a generator/alternator. The force applied by the load is an electro-mechanical counter-torque used to generate electricity by the electrical generator/alternator (and may also consist of other power transfer parameters influencing generated power such as RPM, temperature, pressure etc). There is a fixed electrical load that is consuming the generated power.

Power=force*(distance/time)

As the counter torque (rotational force applied through a distance) is increased, RPM decreases.

An optimum power transfer occurs as a balance between applied force and RPM is reached at a force loading of 8, graph point 106.

FIG. 1 shows that generated power does not necessarily increase as the electromechanical counter torque that the generator places on the driving engine is increased. FIG. 1 plots a graph demonstrating how the output generated electrical power varies as the electromechanical counter torque is increased on the driving engine. At zero levels of loading, such as a load between zero to one, illustrated in FIG. 1 in the area of point 102, no power from the driving engine is converted into its desired form, electrical power. A good analogy of this is an engine that is not hooked up to an alternator, or a turbine that is not hooked up to a generator or an alternator. No power can be generated without a load.

As the generator begins to convert more mechanical power into electrical power, it places a greater mechanical load on the driving engine. This relationship of increased generated power from the generator placing a greater mechanical load on the driving engine as it converts mechanical power into electrical power reaches a maximum at a load of between 7 and 9 in FIG. 1. (FIG. 1 is normalized and is unitless for generality). Between these points, maximum power transfer from the driving engine to the desired form, electrical power, has occurred. Unfortunately, as the electromechanical counter torque that the generator places on the driving engine continues to increase, the RPM begins to decline such that the product of torque*RPM results in less generated power. While FIG. 1 specifically illustrates generated electrical power versus force applied by load, it may also apply to mechanical power outputs, any type of input, and any type of load. An example would be a small windmill designed to pump water to livestock, having attached to it a quite large electricity-generating device such as a generator from a hydroelectric dam. Even if there is much wind, the windmill barely is able to turn over because of the large counter torque placed on it by the large generator and so little power is produced. If the wind slightly diminishes then the windmill is entirely overpowered by the load and ceases to turn, again resulting in no power generation, as might be depicted by point 110 on FIG. 1. Although there may be sufficient wind to allow generation of power by an alternative lighter load, no power is actually being generated by the large generator due to the mismatch of the load to its power source.

As mentioned previously, one solution is to match the components from the perspective of power transfer. An ideal system would include having a motor with a throttle position setting that produces a certain amount of horsepower at a specified optimal RPM matched with an electrical generator that generates the same amount of power as the motor at the optimal power producing RPM.

However, in the real world, an electrical generator system is confronted with many variables affecting the efficiency of power transfer from the driving engine to the final product, electrical power. Some of these variables will include power input fluctuations from engine throttling, system component wear resulting in changed performance characteristics, grade of fuel for an internal combustion engine and so on. Engineers may try to modify a system's drive device to try to cause it to perform efficiently within broad ranges. In many cases (such as a windmill) this is virtually impossible.

It is important to realize that when an engine is driving a load, such as an electromechanical load placed on it by an electrical generator, power related and efficiency characteristics of both the driving engine and the generator come into play as a system. For example at a specified throttle position, a combustion engine will convert fuel into rotational mechanical power most efficiently at a specified RPM. However a generator that this engine is intended to drive may convert rotational mechanical power to electrical power at an optimum RPM that is different than that of the driving engine. This is in fact the most likely case. In this simple system where the driving motor and the alternator are directly attached by a shaft, the throttle position is held constant, a constant electrical load is placed on the alternator, and the only variable is the electromechanical load placed on the motor by the generator that is optimized for maximum power transfer of the system as a whole; maximum power transfer will occur neither at the generator's optimum RPM nor at the engine's optimal RPM. Rather, maximum power transfer will occur at an RPM that will reflect all of the power transfer related characteristics of the whole system as it is influenced by the load, or other power transfer related characteristics. It would be preferable to provide a system in which power transfer parameter optimization is carried out for the device as a whole, and is carried out dynamically rather than statically.

SUMMARY OF THE INVENTION

General Summary

The present invention teaches that rather than optimizing the drive device alone, optimization must be viewed from the perspective of the system as a whole. In addition, instead of static optimization, system optimization involves dynamically increasing or decreasing the load, torque, counter torque, force and other power transfer parameters that influence the efficiency of the transfer of power from the driving power source to the system power out, based on system power output measurements.

The present invention teaches a method and device for optimizing either one or both of work and power output of a power generation system. A typical electrical power generation system is illustrated as having three main portions: a source of power and a generator and a load to consume power.

Sources of Power

Sources of mechanical power could be vehicle engines, turbines turned by moving liquids including solar panel working liquids, hydro-power, geothermal system working liquids, wave and tidal power, hydrocarbon fueled motors, turbines driven by steam or other moving gases in various types of power plants (solar, nuclear, and so on) any source of thermodynamic power, or any source of mechanical power. Such systems are often but not always characterized by the presence of a rotating shaft or other mechanical motion, which is directed to the load. The present invention may be used with such systems or with systems, which transfer power from the motive source to the load by some other means: reciprocation, electrical transfer, hydraulic transfer and so on.

Definition: Power Transfer Parameter:

A power transfer parameter is any factor or combination of factors that can be increased or decreased, that will increase or decrease power generating system power output and may be used to optimize power generation system power output. A power transfer parameter is any factor or combination of factors that can be increased or decreased to optimize transfer of power from the driving power motive source to the end product of the power producing system, system power output.

A power transfer parameter further comprises one member selected from a group consisting of but not limited to the following power transfer parameters: RPM, temperature, current, pressure, load, force, torque, counter torque, density, intensity, speed, acceleration, pitch, angle, chemical ratio, quantity, voltage, conductance, magnetic flux density, light intensity, electrical frequency, light frequency, magnetic frequency, time, time duration, rate of occurrence, proximity, viscosity, heat, shape, leverage and combinations thereof.

Power Transfer Parameters

Power transfer parameters can be a typical load, force, torque or counter torque applied to the power source by a power-generating device such as an electricity-generating device (an alternator or generator for example) but may be a direct end-user load for industrial applications or the like. This would include facilities that generate and then use mechanical energy directly: the traditional waterwheel powered grain mill is a straightforward (if outmoded) example of this.

However there are many types of parameters, or power transfer parameters, that can influence the power in a power generating system. For example: the electromechanical load offered by the generator, or other power transfer parameters may be dynamically altered, increased or decreased, in response to a change in power output of the generator, so as to continuously adjust the power generating system towards maximum power transfer.

Generator Types

A power generating system using the Optimal Load Controller Method and Device may use a generator as a load that may be a mechanically driven electricity generating device consisting of one member selected from a group consisting of: any mechanically driven electrical generator, any alternator, any dynamo, a variable load generator, a mechanically driven electricity generation device with a variable current field winding that produces magnetism, a variable load alternator and an electrical generator that may place a variable electromechanical load on the driving motive force to produce electricity.

Generator Types: Generator Electromechanical Load as a Power Transfer Parameter

In one embodiment, a mechanical power source may drive an electricity generator, and the current through the field winding or rotor winding may be dynamically varied to produce electricity. As the rotor current is varied, it produces a magnetic field that varies in intensity, that slices through the stationary set of electrically insulated conductor coil windings, located in the stator, generating an alternating electrical current which is consumed by a load that also varies, as the rotor turns. As current through the windings of the generator is altered, increased or decreased, the electromechanical load offered to the motive driver of the system changes, affecting the transfer of power from the source to the system's output: electrical power; it is therefore a power transfer parameter. Also, the electromechanical load of the electricity generation device may be removed, applied and varied by applying, removing or varying the field winding current.

Generator Types: The RPM Actuated Generator Configuration

The Optimal Load Controller Method and Device may use an electrical generating device driven by a source of power comprising:

A generating device which is mechanically driven by an alternator such that, when a variable electrical current flows through conductors that are electrically insulated and formed as coil windings located in the rotor, it produces a magnetic field that varies in intensity, that slices through the stationary set of electrically insulated conductor coil windings, located in the stator, generating an alternating electrical current as the mechanical input causes the rotor to turn.

A cooling system, which cools the generator's field windings, which is actuated when the generator's rotor is turning. The cooling system may be mechanically driven by the rotor's shaft, and may use a device such as fan blades, or a pump, which forces coolant, that may be air, gas or liquid, past the rotor and stator windings cooling them by carrying heat away from the insulated windings, which may be further cooled by other mechanisms such as a radiator.

A means to apply or remove the electromechanical load, torque, counter torque and forces produced by allowing or disallowing heat producing electrical current to flow through the rotor winding conductors that are formed as coils, based on continuous monitoring of the rate, RPM, or speed, of the generator's rotor. At the set "turn on" rate, RPM or speed, electrical field winding current is applied to rotor winding coils generating heat and producing a magnetic field. At the set "turn off" rate, RPM or speed, electrical field winding current heat producing current, is interrupted and ceases to flow. The "turn on" and "turn off" rate, RPM, or speed thresholds are such that the "turn off" threshold setting is a lesser rate, RPM, or speed than the "turn on" setting to avoid ambiguity. It is important to note that heat causing electrical current is enabled only when forced cooling is actuated.

The RPM Actuated Generator Configuration offers the following advantages:

The ability to carry more heat causing electrical current because the generator's heat causing field winding current will not flow until the generator's RPM or speed is sufficient to equal or surpass the "turn on" threshold, when far more efficient forced cooling is able to dissipate winding heat.

The size requirements of the movement actuated alternator rotor are such that it can be made smaller and have a smaller rotor diameter than the rotor of the prior art conventional alternator, because it does not need to dissipate heat buildup from electrical current occurring when the alternator is stationary without the aid of forced cooling.

The rotor of the movement actuated generator may have a smaller diameter, using less construction material and weighing less while having the same rotating rotor current carrying ability as compared to the prior art conventional generator.

Generator rotor winding efficiency may be increased because the rotor now has a diminished diameter requirement and therefore a reduced electrical current requirement; more magnetic flux generated by electrical current flowing through the rotor conducting coil windings in the rotor now is cutting through more of the stator insulated conductor windings, the insulated conduction windings that generate electrical power.

It protects the field windings from overheating and possibly burning because electrical current is applied only when the generator has reached a speed or RPM where there is sufficient "forced cooling".

It is also efficient since it is a waste of power to apply current to the field winding if the driving motive source of power is not turning the rotor because no power will be generated.

Load Engaging System

A means to apply or remove a generator load or other power transfer parameters is employed so as to provide optimum results. The "Load Engaging System" used in the "Optimal Load Controller Method and Device" provides a means to engage or disengage one or more power transfer parameters and combinations thereof. This is based on continuous monitoring of the rate, RPM or the speed of the source of power, and the set "turn on" and set "turn off" rate/RPM/speed value are such that the "turn off" value or setting is a lesser value than the "turn on" setting.

The "Load Engaging System" also provides a means to initialize the controller or "Load Selecting Circuit" to start optimizing a selected load or selected power transfer parameter setting, while all other load or power transfer parameter settings, and application of those settings are held constant or at a beginning setting or intensity. This involves, continuous monitoring of the RPM or the speed of the source of power, initializing power transfer parameter settings when a transition occurs in a power source that is accelerating where the original RPM or speed that is below the "turn off" threshold becomes equal to or greater than the "turn on" threshold RPM or speed.

Furthermore the "Load Engaging System" offers a means to momentarily set the beginning intensity or setting of one or more applied power transfer parameters from which change will be implemented. Loads, torques, counter torques and forces are generally initialized with a beginning intensity such that as they increase from their initialized applied intensity generated power will increase towards maximum power transfer. However power transfer parameters may have an initial setting that may be greater than or less than what is required to achieve maximum power transfer, and their applied setting will either increase or decrease towards maximum power transfer. This is based on continuous monitoring of the RPM or the speed of the source of power, initializing power transfer parameter settings when a transition occurs in a power source that is accelerating where the original RPM or speed that is below the "turn off" threshold becomes equal to or greater than the "turn on" threshold speed/RPM.

The "Load Engaging System" provides a means to initialize the direction of the power transfer parameter setting(s) to be increasing or decreasing towards maximum power transfer. Loads, torques, counter torques and forces are initialized to be increasing and other power transfer parameters may be initialized to be increasing or decreasing. "Load Engaging System" initialization is based on continuous monitoring of the RPM or the speed of the source of power, initializing power transfer parameter settings when a transition occurs in a power source that is accelerating where the original RPM or speed that is below the "turn off" threshold becomes equal to or greater than the "turn on" threshold RPM or speed.

The "Load Engaging System", works in conjunction with "Load Controller Circuits", offering a means to adjust the rate of change, increasing or decreasing, that is appropriate for the application of each individual power transfer parameter in the power generation system. The rate at which the direction of application, increasing or decreasing, of variable generator loading and other power transfer parameters is controlled. Power transfer parameters are increased and decreased at a predetermined specific rate that is appropriate for each individual power transfer parameter to achieve maximum generated power optimization.

Load Selection and Multiple Power Transfer Parameters Power Optimizing Sampling & Controlling In addition to optimizing the variable load that may be placed by the generator on the motive power source, other power transfer influencing parameters may also be increased or decreased dynamically so as to optimize the transfer of power from the motive source to output of the system. In the case where more than one power transfer parameter is to be optimized, their effect on generated power must be isolated. This is implemented by increasing or decreasing one selected power transfer parameter at a time, while holding the application of all others at a constant setting. A move on criterion rotates power transfer parameters, selecting one at a time for optimization, and is implemented so that each power transfer parameter has enough time to be optimized.

Generated system output power sampling determines if power is increasing or decreasing and if the direction of the application of the selected power transfer parameter, increasing or decreasing, should remain constant or should be reversed such that generated power continually moves towards maximum power transfer. In the figures, this point may be found in FIG. 2 at graph point 206.

Power output is continuously being sampled. Samples may be tested at first and second times. Either of the first or second samples may correspond to a most recent time, while the other sample may correspond to a previous time. If power output is increasing as determined by a comparison of past and present power samples, then the direction of the selected power transfer parameter, increasing or decreasing as the case may be, is maintained. On the other hand, if the power output is decreasing as measured by the difference between the present and past power samples, the direction, increasing or decreasing of the selected load, or power transfer related parameter, is reversed. This process repeats itself continually seeking a setting or the best application of a power transfer parameter to move generated power in the direction of maximum power transfer, graph point 206.

It is important to understand that when the system is in its power optimization mode and adjusting power parameters so as to optimize generated power, that the system is also transferring power from the power source to the load or electromechanical generating device where the amount of load, torque, counter torque, force or other power transfer parameters and combinations thereof are less than an amount required to stall the driving motive source; as soon as power starts to decrease, the direction of the power transfer parameter is reversed.

Optimizing one or more power transfer parameters through dynamic sampling of generated power, and optimizing the selected power transfer parameter in response to measured changes in power output of the power generation system makes the system itself extremely flexible, such that it is able to adapt to varying conditions placed on the system and system parameters including but not limited to: wear, different fuels or quality of fuels, changes in the electrical load placed on said generator, changes in the input power.

Summary in Reference to Claims

It is therefore another aspect, advantage, objective and embodiment of the present invention to provide a method of optimizing generated power output of a power generation system, the method comprising the steps of:
1) providing a source of power;
2) providing a load that consumes system generated power out;
3) providing a controller configured to employ the following steps:
   a. providing one or more power transfer parameters operatively connected and responsive to said power generation system that may be applied to the system, selected for optimization and optimized by said controller;
   b. selecting one power transfer parameter for optimization;
   c. optimizing power generation system power output by increasing or decreasing the selected power transfer parameter as required to maximize system power output based on the power generating system's power output measurements: a "load optimizing system" operatively connected and responsive to said controller.

It is therefore another aspect, advantage, objective and embodiment of the present invention to provide a method of optimizing generated power output that may further comprise providing a power source consisting of one member selected from a group consisting of: a source of mechanical power, any device that is used to perform mechanical work, a source of thermodynamic power, and a solar source of thermodynamic power.

It is therefore another aspect, advantage, objective and embodiment of the present invention to provide a method of optimizing generated power output wherein the power transfer parameter consuming power generating system generated power, may further comprise the step of providing a mechanically driven electricity generating device that may apply an electromechanical load to the power generating system consuming power by supplying electrical power to an electrical load.

It is therefore another aspect, advantage, objective and embodiment of the present invention to provide a method of optimizing generated power output wherein the mechanically driven electricity generating device is one member selected from a group consisting of a fixed load electrical generator, a fixed load alternator, a fixed load dynamo, a variable load electrical generator, a variable load alternator, a variable load dynamo, an electrical generator that may place an electromechanical load on the source of power and combinations thereof.

It is therefore another aspect, advantage, objective and embodiment of the present invention to provide a method of optimizing generated power output wherein the mechanically driven electricity generating device may further comprise providing that device with a variable current field winding whereby the electromechanical load of the electricity generation device may be removed, applied and varied by applying, removing or varying the field winding current.

It is therefore another aspect, advantage objective and embodiment of the present invention to provide a method of optimizing generated power output wherein the mechanically driven electricity generating device is a mechanically driven generator/alternator having an electromechanical load which varies as a function of a variable electrical current passing through windings of the generating device; the generating device further having a mechanically driven cooling system that is dependent on the generating device's rate; the generating device further comprising a first engaged state in which the generating device's electromechanical load is applied and a second disengaged state in which the electromechanical load is removed based on a selected generating device's rate.

It is therefore another aspect, advantage, objective and embodiment of the present invention to provide a method of optimizing generated power output that may further comprises the step of applying and removing one or more power transfer parameters: a "load engaging system" operatively connected and responsive to the controller.

It is therefore another aspect, advantage, objective and embodiment of the present invention to provide a method of optimizing generated power output wherein the "load engaging system" further comprises the following steps:
1) applying and removing one or more power transfer parameters and combinations thereof, based on continuous monitoring of the rate of the source of power;
2) setting a beginning intensity of one or more applied power transfer parameters from which change will be implemented;
3) setting an initial direction of one or more power transfer parameter settings to be increasing or decreasing towards maximum power transfer;
4) setting a rate of change, increasing or decreasing, that is appropriate for the application of each individual power transfer parameter in the power generation system.

It is therefore another aspect, advantage, objective and embodiment of the present invention to provide a method of optimizing generated power output wherein the step of selecting one power transfer parameter for optimization further comprises the step of holding all other power transfer parameters, that are operatively connected to the power generation system for optimization by the controller, constant in their last setting while one power transfer parameter is being selected and optimized by the controller: a "load selecting system" operatively connected and responsive to the controller.

It is therefore another aspect, advantage, objective and embodiment of the present invention to provide a method for optimizing power output wherein the "load optimizing system" further comprises the following steps:
1) measuring system power output;
2) determining the direction of system power output, increasing or decreasing, by comparing delayed power output measurements to more recent power output measurements;
3) varying the selected power transfer parameter so as to optimize the transfer of power by either increasing or decreasing the power transfer parameter based upon the result of the comparison of power output measurements, increasing or decreasing.

It is therefore another aspect, advantage, objective and embodiment of the present invention to provide a method for optimizing power output wherein the "load optimizing system" may further comprise the step of reusing the load optimizing device to control one or more power transfer parameters.

It is therefore another aspect, advantage, objective and embodiment of the present invention to provide a method of optimizing generated power output wherein the "load optimizing system" comprises the step of varying the selected power transfer parameter so as to optimize the transfer of power by either increasing or decreasing the power transfer parameter based upon the determined direction of system output power, increasing or decreasing, in an amount that will not stall the power generation system.

It is therefore another aspect, advantage, objective and embodiment of the present invention to provide a controller device optimizing generated power output of a power generation system comprising the following:
1) a device that may apply, remove and select one or more power transfer parameters that are operatively connected and responsive to said power generation system, and are optimized by said controller device;
2) a device that selects one power transfer parameter for optimization operatively connected and responsive to said controller device;
3) a power generating system optimizing device that increases system power output by increasing or decreasing the selected power transfer parameter as required to maximize system power output based on the power generating system's power output measurements: a "load optimizing system" operatively connected and responsive to said controller device.

It is therefore another aspect, advantage, objective and embodiment of the present invention to provide a controller device optimizing generated power output, wherein the power transfer parameter consumes power generating system generated power, may further comprise providing a mechanically driven electricity generating device that may apply an electromechanical load to the power generating system consuming power by supplying electrical power to an electrical load.

It is therefore another aspect, advantage, objective and embodiment of the present invention to provide a device optimizing generated power output, wherein the mechanically driven electricity generating device is one member selected from a group consisting of a fixed load electrical generator, a fixed load alternator, a fixed load dynamo, a variable load electrical generator, a variable load alternator, a variable load dynamo, an electrical generator that may place an electromechanical load on the source of power and combinations thereof.

It is therefore another aspect, advantage, objective and embodiment of the present invention to provide a device optimizing generated power output, wherein the mechanically driven electricity generating device may further comprise providing that device with a variable current field winding, whereby the electromechanical load of the electricity generation device may be removed, applied and varied by applying, removing or varying the field winding current.

It is therefore another aspect, advantage, objective and embodiment of the present invention to provide a device optimizing generated power output wherein the mechanically driven electricity generating device is a mechanically driven generator/alternator having an electromechanical load which varies as a function of a variable electrical current passing through windings of the generating device; the generating device further having a mechanically driven cooling system that is dependent on the generating device's rate; the generating device further comprising a first engaged state in which the generating device's electromechanical load is applied and a second disengaged state in which the electromechanical load is removed based on a selected generating device's rate.

It is therefore another aspect, advantage, objective and embodiment of the present invention to provide a device optimizing generated power output that may further comprise a device that applies and removes one or more power transfer parameters: a "load engaging system" operatively connected and responsive to the controller device.

It is therefore another aspect, advantage, objective and embodiment of the present invention to provide a device optimizing generated power output wherein the "load engaging system" further comprises:
1) a device to apply and remove one or more power transfer parameters and combinations thereof, based on continuous monitoring of the source of power;
2) a device to set a beginning intensity of one or more applied power transfer parameters from which change will be implemented;
3) a device to set an initial direction of one or more power transfer parameter settings to be increasing or decreasing towards maximum power transfer;
4) a device to set a rate of change, increasing or decreasing, that is appropriate for the application of each individual power transfer parameter in the power generation system.

It is therefore another aspect, advantage, objective and embodiment of the present invention to provide a device optimizing generated power output wherein the device that selects one power transfer parameter for optimization may further comprise a device that holds all other power transfer parameters that are operatively connected to the power generation system for optimization by the controller constant in their last setting while one power transfer parameter is being selected and optimized by the controller device: a "load selecting system" operatively connected and responsive to the controller device.

It is therefore another aspect, advantage, objective and embodiment of the present invention to provide a device for optimizing power output wherein the "load optimizing system" further comprises:
1) a device to measure system power output;
2) a device to determine the direction of system power output, increasing or decreasing, by comparing delayed power output measurements to more recent power output measurements;
3) a device to vary the selected power transfer parameter so as to optimize the transfer of power by either increasing or decreasing the power transfer parameter based upon the result of the comparison of power output measurements, increasing or decreasing.

It is therefore another aspect, advantage, objective and embodiment of the present invention to provide a device for optimizing power output wherein the "load optimizing system" may further comprise reusing the load optimizing device to control one or more power transfer parameters.

It is therefore another aspect, advantage, objective and embodiment of the present invention to provide a device optimizing generated power output wherein the "load optimizing system further comprises varying the selected power transfer parameter so as to optimize the transfer of power by either increasing or decreasing the power transfer parameter based upon the determined direction of system output power, increasing or decreasing, in an amount less than amount required to stall the power generation system.

BRIEF DESCRIPTION OF THE DRAWINGS

FIG. 3 consists of three parts which together present a single flow chart of a first embodiment of the method of the invention.

Figure 1:
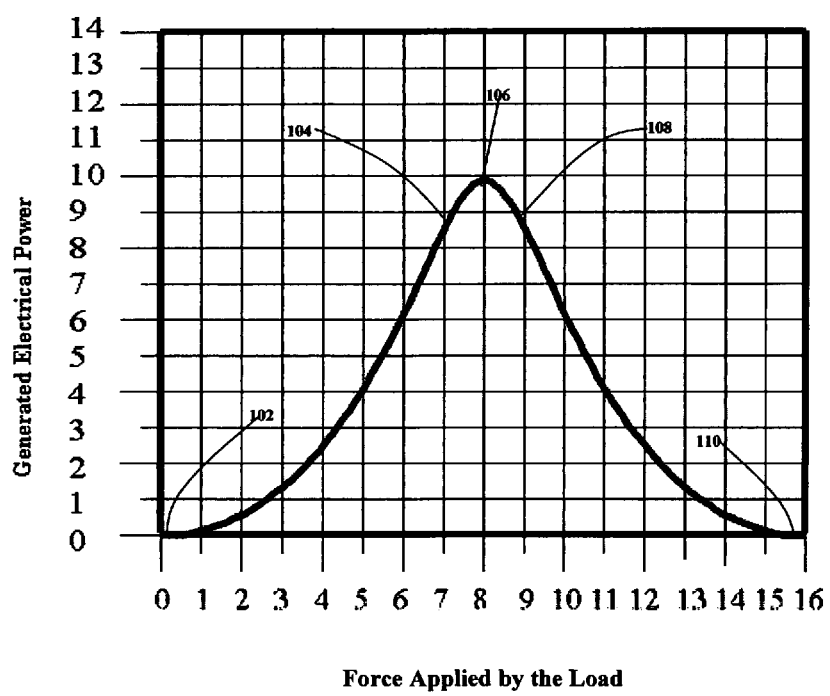
FIG. 1 is a chart of generated power versus load, torque, counter torque, force applied by load.

| Controller Subsystem | Controller Function | Reference Numerals |
|---|---|---|
| "Load Engaging System" | Power transfer load engagement: | 302 to 322 |
| "Load Selecting System" | Power transfer parameter selection: | 324 to 330 |
| "Load Optimizing System" | Power transfer parameter optimization: | 332 to 346 |

Figure 5:
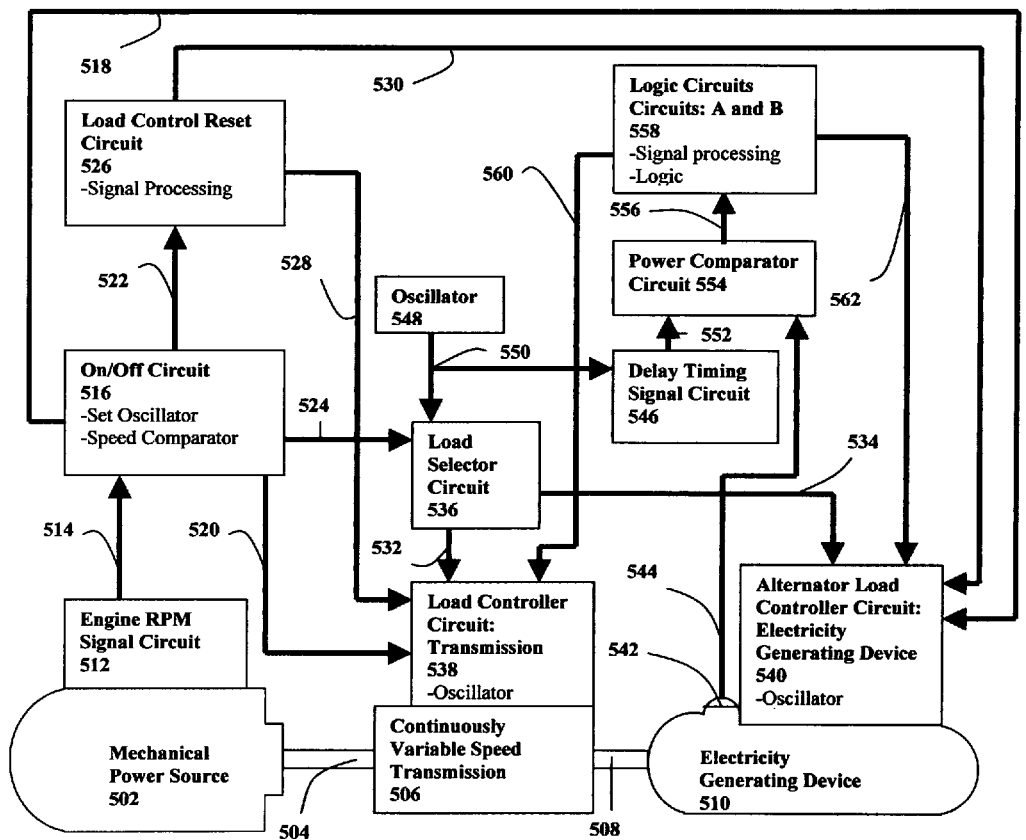

The Index of the Reference Numerals for FIG. 3, associates each subsystem with a range of reference numerals along circuit descriptions and labeling that also corresponds to those given in FIG. 5 and those given in the detailed circuit descriptions of Table One. The controller subsystem grouping of FIG. 3, also applies to FIG. 5 and the detailed circuit descriptions of Table One.

Figure 4:
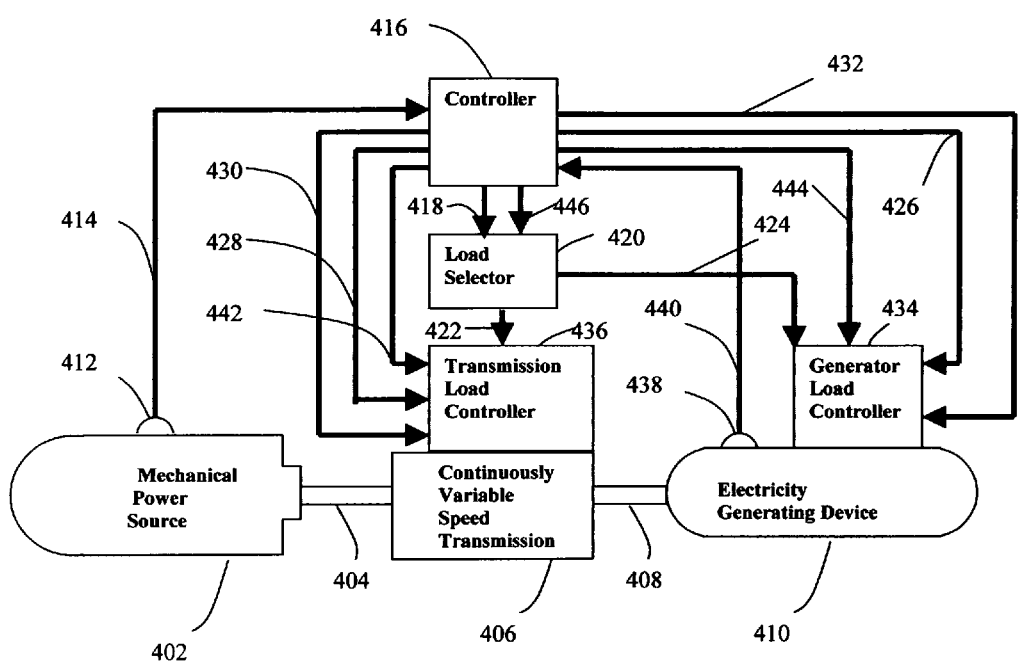

FIG. 4 is a block diagram at a high level of abstraction of the second embodiment of the device.

FIG. 5 is a block diagram of a third embodiment of the device at a lower level of abstraction.

Figure 6A:
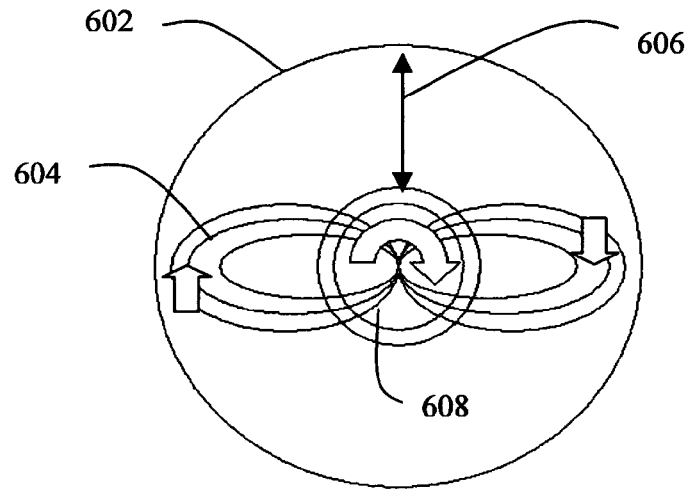
Figure 6B:
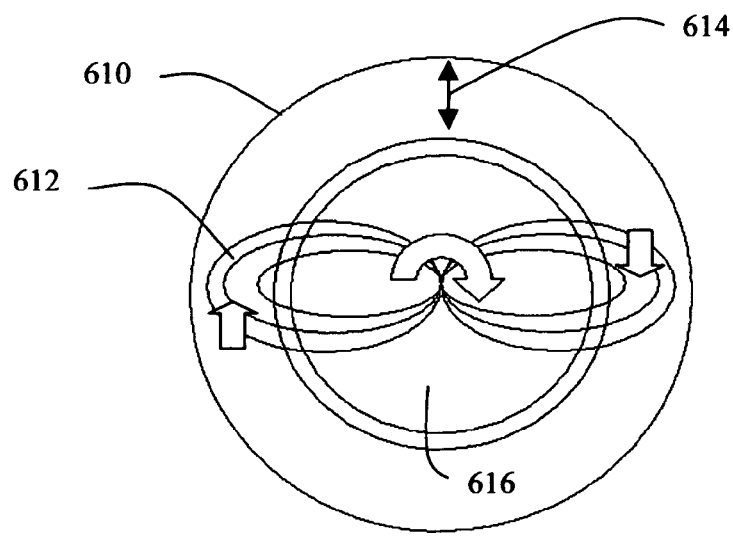

FIG. 6A is a diagram of a "rpm/speed actuated generator/alternator" as compared to FIG. 6B which is a diagram of a "conventional alternator".

Figure 7:
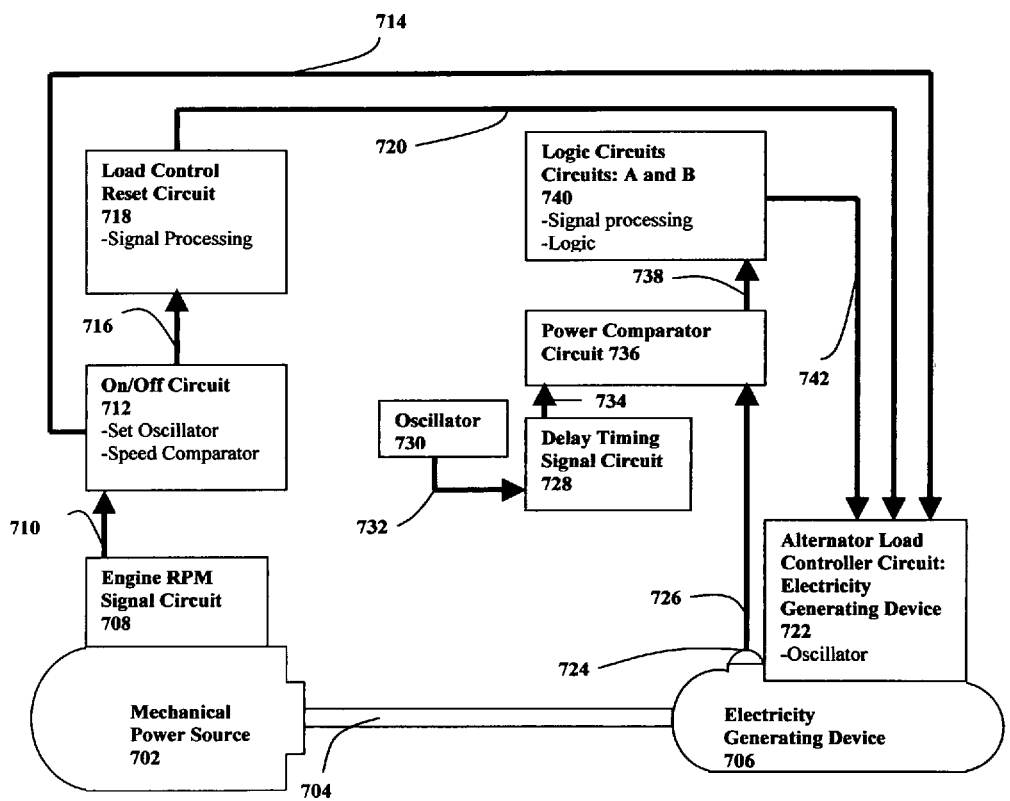

FIG. 7 is a block diagram of a fourth embodiment of the device at a lower level of abstraction.

INDEX OF THE REFERENCE NUMERALS

| | Reference Numerals |
|---|---|
| FIG. 1: Generated Power Versus Force | |
| Graph Points | 102, 104, 106, 108, 110 |
| FIG. 2: Generated Power Versus Power | |

-continued

Figure 3A:
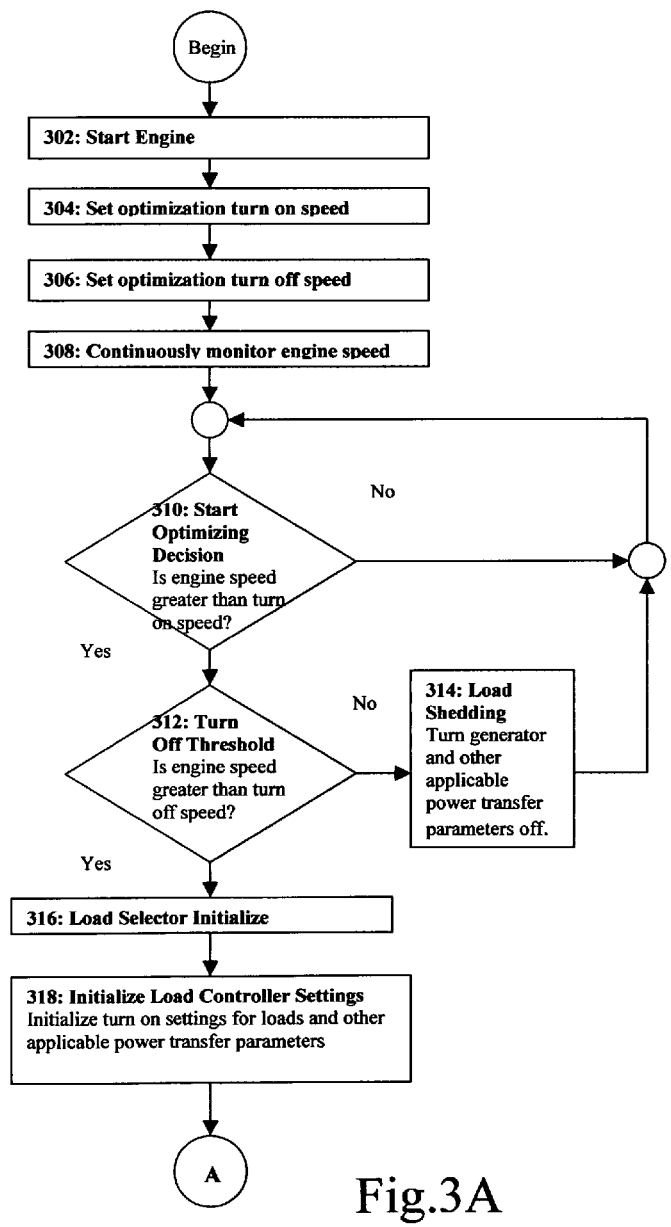
FIGS. 3A, 3B, and 3C are presented on separate pages: 3/9, 4/9, and 5/9. Together these three figures illustrate a controller which may be configured into three subsystems based on their function within the system.
Figure 3B:
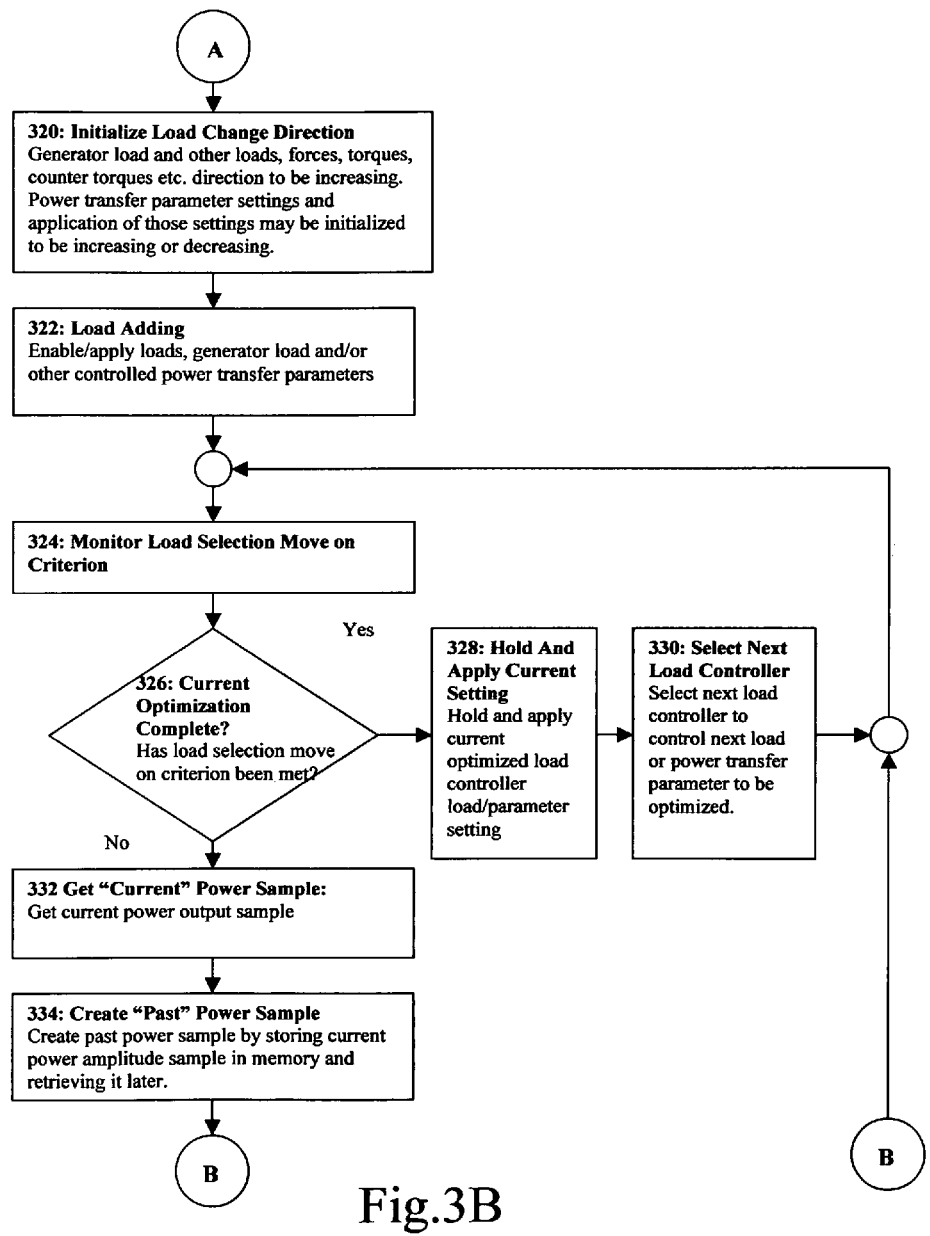
Figure 3C:
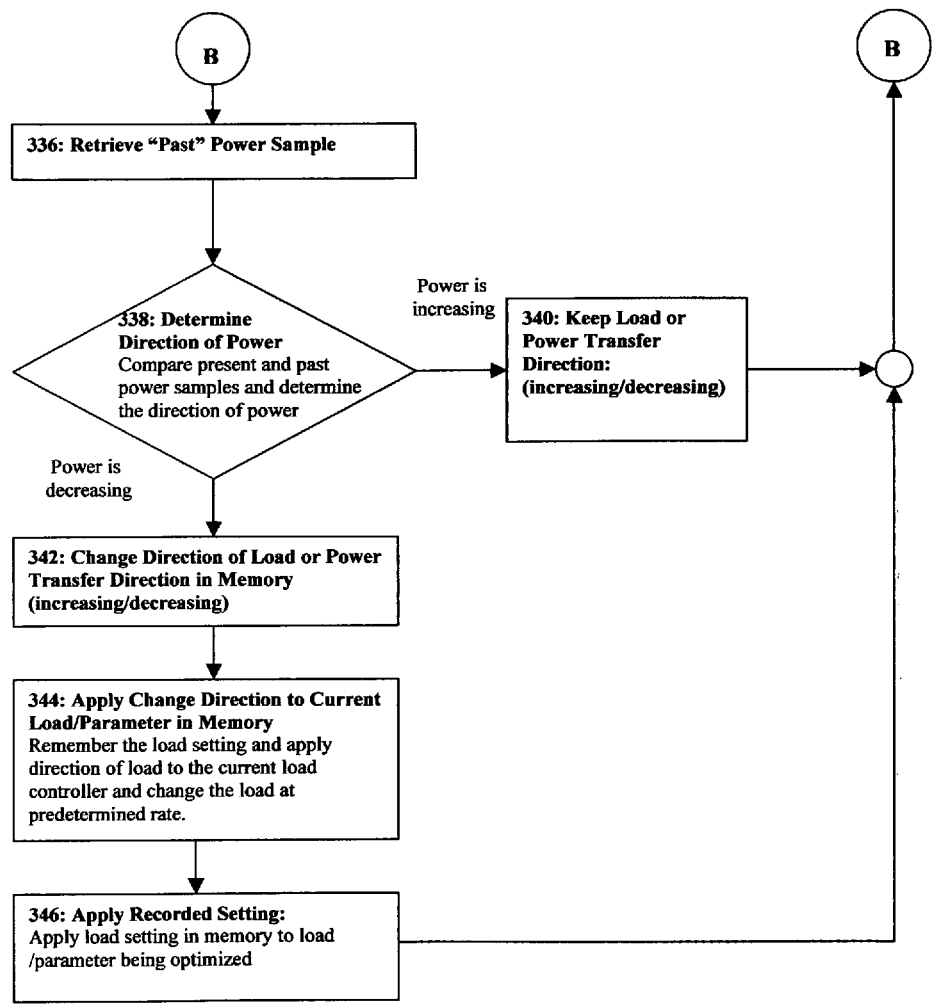

|  | Reference Numerals |
|---|---|
| Transfer Application Setting | |
| Graph Points | 202, 204, 206, 208, 210 |
| FIG. 3A, FIG. 3B, FIG. 3C: Flow Chart of the First Embodiment of the Invention Controller Subsystem | |
| FIG. 3: Load Engaging System: | 302 to 322 |
| FIG. 3: Load Selecting System: | 324 to 330 |
| FIG. 3: Load Optimizing System: | 332 to 346 |
| FIG. 3A: | |
| Start Engine "Engine RPM Signal Circuit" | 302 |
| Set Optimization Turn On Speed "On Off Circuit" | 304 |
| Set Optimization Turn Off Speed "On Off Circuit" | 306 |
| Continuously Monitor Engine Speed "Engine RPM Signal Circuit" "On Off Circuit" | 308 |
| Start Optimizing Decision: Is engine speed greater than turn on speed? Make flow decision: "Yes": go to step 312 "No": start step 310 again "Engine RPM Signal Circuit" "On Off Circuit" | 310 |
| Turn Off Threshold: Is engine speed greater than turn off speed? Make flow decision: "Yes": go to step 316 "No": go to step 314 "Engine RPM Signal Circuit" "On Off Circuit" | 312 |
| Load Shedding: Turn generator and other power transfer parameters off Go to step 310 "On Off Circuit" | 314 |
| Load Selector Initialize: Load adding "On Off Circuit"("off to on" transition signal") "Load Selector Circuit" (selects initial load parameter to be optimized) | 316 |
| Initialize Load Controller Settings: Load adding "On Off Circuit" (supplies "off to on" transition signal") "Load Controller Reset Circuit" ("provides timed signals") "Load Controller Circuit" (provides initial load setting) FIG. 3B: | 318 |
| Initialize Load Change Direction: increasing/decreasing: Load adding Generator load and other loads forces, torques, counter torques directions are initialized to be increasing towards maximum power transfer. Power transfer parameter settings and application of those settings may be initialized to be increasing or decreasing towards maximum power transfer. "On/Off Circuit" ("off to on" transition signal") "Load Controller Reset Circuit" (properly timed signal) "Logic Circuits A and B": "Logic Circuit B" (retains memory of load direction) Note there are two logic circuit sections "Logic Circuit A" and "Logic Circuit B" | 320 |
| Enable/Apply Loads & Other Power Transfer Parameters: Load Adding "On Off Circuit" ("off to on" transition signal") | 322 |
| Monitor Load Selection Move On Criterion "Delay Timing Signal Circuit" (Labeled Oscillator 548 in Diagram/FIG. 5) "Load Selector Circuit" | 324 |
| Current Optimization Complete? Make flow decision: "No?", "Yes?" Yes: Go to step 328 No: Go to step 332 "Delay Timing Signal Circuit" (Oscillator 548 in FIG. 5) "Load Selector Circuit" | 326 |

-continued

|  | Reference Numerals |
|---|---|
| Counts oscillations from (Oscillator 548 in FIG. 5), makes decision based on count. | |
| Hold and Apply Current Setting "Load Controller Circuit" "Load Selector Circuit" (enable/disable signal control) | 328 |
| Select Next Load Controller Flow of control returns to step 324 "Load Selector Circuit" (enable/disable signal control) | 330 |
| Get Current Power Sample "Power Sensor Circuit" (provides analog sample) "Delay Timing Circuit" (provides signal to A/D converter) "Power Comparator Circuit" (digitizes and stores analog sample) | 332 |
| Create Past Power Sample by Storing "Power Comparator Circuit" (storage registers) "Delay Timing Circuit" (provides required signals) FIG. 3C | 334 |
| Retrieve Past Power Sample "Power Comparator Circuit" (storage registers) "Delay Timing Circuit" (provides signals) | 336 |
| Determine Direction of Power and Make Flow Decision "Power Comparator Circuit" (determines direction of power) "Logic Circuits: A and B": "Logic Circuit A" (signal processing) "Logic Circuit B" (logic direction) | 338 |
| Keep Load or Power Transfer Parameter Direction (increasing/decreasing) "Logic Circuits: A and B": "Logic Circuit A" (signal processing) "Logic Circuit B" (logic direction) | 340 |
| Change Load Direction in Memory (increasing/decreasing) "Logic Circuits: A and B": "Logic Circuit A" (signal processing) "Logic Circuit B" (logic direction) | 342 |
| Apply change direction to load/parameter setting in memory "Load Controller Circuit" "Load Selector Circuit" (enables current load controller) | 344 |
| Apply Recorded Setting "Load Controller Circuit" Flow of control returns to step 324 FIG. 4 | 346 |
| Block Diagram at a High level of Abstraction of the Second Embodiment of the Device | |
| Mechanical Power Source | 402 |
| Power Transfer | 404 |
| Continuously Variable Speed Transmission | 406 |
| Power Transfer | 408 |
| Electricity Generating Device | 410 |
| RPM Sensor | 412 |
| RPM Signal | 414 |
| Controller | 416 |
| Initialize Load Selector Signal: Controller to Load Selector | 418 |
| Load Selector | 420 |
| Enable Load Controller Signal: Transmission Load Controller | 422 |
| Enable load Controller Signal: Generator Load Controller | 424 |
| Initialize Generating Device Signal | 426 |
| Initialize Transmission Signal | 428 |
| Transmission Load Adding/Load Shedding Signal | 430 |
| Generator Load Adding/Load Shedding Signal | 432 |
| Load Controller: Generating Device | 434 |
| Load Controller: Transmission | 436 |
| Power Sensor | 438 |
| Power Sensor Signal: Power Sensor to Controller | 440 |
| Increment/Decrement Transmission Signal | 442 |
| Increment/Decrement Generator Signal | 444 |
| Load Selector Criteria Signal | 446 |
| FIG. 5: Block Diagram of a Third Embodiment of the Device at a Lower Level of Abstraction | |
| Mechanical Power Source | 502 |
| Power Transfer | 504 |
| Continuously Variable Speed Transmission | 506 |
| Power Transfer | 508 |
| Electricity Generating Device | 510 |

-continued

| | Reference Numerals |
|---|---|
| "Engine RPM Signal Circuit" | 512 |
| "Engine RPM Signal Circuit" Signal | 514 |
| "On Off Circuit" | 516 |
| Generator: Load Adding/Load Shedding Signal | 518 |
| Transmission: Load Adding/Load Shedding Signal | 520 |
| Signal from "On Off Circuit" to "Load Control Reset Circuit" | 522 |
| Initialize "Load Selector Circuit" signal | 524 |
| "Load Control Reset Circuit" | 526 |
| Initialize transmission "Load Controller Circuit" Signal | 528 |
| Initialize "Alternator Load Controller Circuit" Signal | 530 |
| Enable transmission "Load Controller Circuit" Signal | 532 |
| Enable "Alternator Load Controller Circuit" Signal | 534 |
| "Load Selector Circuit" | 536 |
| "Load Controller Circuit": Transmission | 538 |
| "Alternator Load Controller Circuit": Generator | 540 |
| "Power Sensor Circuit" | 542 |
| "Power Sensor Circuit" Power Sample Signal | 544 |
| "Delay Timing Signal Circuit" | 546 |
| Oscillator | 548 |
| Oscillator Signal | 550 |
| "Delay Timing Circuit" Signal | 552 |
| "Power Comparator Circuit" | 554 |
| "Power Comparator Circuit" Result Signal | 556 |
| "Logic Circuits: A & B" | 558 |
| "Logic Circuits'" Signal (increase/decrease: transmission load controller) | 560 |
| "Logic Circuits'" Signal (increase/decrease: generator load controller) | 562 |
| FIG. 6A: "RPM/Speed Actuated Generator/Alternator" Compared to FIG. 6B: "Conventional Alternator" FIG. 6A | |
| Movement activated alternator stator | 602 |
| Movement activated alternator rotating magnetic field | 604 |
| Movement activated alternator larger stator field winding area | 606 |
| Movement activated alternator rotor | 608 |
| FIG. 6B | |
| Conventional Alternator Stator | 610 |
| Conventional Alternator Rotating Magnetic Field | 612 |
| Conventional Alternator Smaller Stator Field Winding Area | 614 |
| Conventional Alternator Rotor | 616 |
| FIG. 7: Block Diagram of a Fourth Embodiment of the Device at a Lower Level of Abstraction | |
| Mechanical Power Source | 702 |
| Power Transfer | 704 |
| Electricity Generating Device | 706 |
| Engine RPM Signal Circuit | 708 |
| Engine RPM Signal | 710 |
| On Off Circuit | 712 |
| Load adding, load Shedding Signal | 714 |
| Signal from On Off Circuit to Load Control Reset Circuit | 716 |
| Load Control Reset Circuit | 718 |
| Initialize Generator Load Controller Signal | 720 |
| Load Controller Circuit: Generator | 722 |
| Power Sensor Circuit | 724 |
| Power Sensor Sample Signal | 726 |
| Delay Timing Signal Circuit | 728 |
| Oscillator | 730 |
| Oscillator Signal | 732 |
| Delay Timing Circuit Signals | 734 |
| Power Comparator Circuit | 736 |
| Power Comparator Circuit Result Signal | 738 |
| Logic Circuit: A & B | 740 |
| Logic Circuits' Signal to Alternator Load Controller | 742 |

DETAILED DESCRIPTION

Further areas of applicability of the present invention will become apparent from the detailed description provided hereinafter. It should be understood that the detailed description and specific examples are intended for purposes of illustration only and are not intended to limit the scope of the invention, its application or uses.

As briefly noted previously, FIG. 1 is a chart depicting the relationship of generated electrical power output by a power generation system (power being defined as the rate at which work is accomplished expressed as: power=work/time) as the electromechanical counter torque that a generator places on the driving motive force is increased, and the "throttle position" of the driving motive force is held at a constant setting (for example: in the case of a windmill, the wind speed is constant, in the case of an electric motor the input voltage is held constant etc.). Work is defined as a force times a distance. Engineers view work as useful work being accomplished. Power, therefore, can be viewed as the rate at which useful work is performed. One example would be a windmill that is not attached to its driving load, a generator. The wind is blowing at a constant speed, and the windmill blades are turning at their fastest rate. Although energy is being consumed at a specific rate (power), it is being consumed almost entirely as friction. No useful work has been accomplished: no electrical power is generated, graph point 102. The other extreme would be a system in which the generator is mismatched: the generator is far too big and exerting too much counter-torque for the windmill and the wind is still blowing at the same speed. Although the load is applied, the counter torque or force that is applied is too great for the windmill to move the axel of the generator mechanically. Energy is once again being consumed at the same rate (power) and again in the form of friction. However in this case the blades of the windmill are not turning the generator and the system is stalled, graph point 110. In both of these systems no useful work is being accomplished, and therefore there is no useful electrical power being generated. In terms of efficiency, both of these examples are 100% inefficient.

Thus in more detail, FIG. 1 demonstrates this effect of force over the entire range: from no force or counter torque applied by the load, graph point 102, to too great of a force applied by the load such that no power is produced, graph point 110, while the driving motive power source is held in a constant throttle position. The type of graph shape that FIG. 1 plots is commonly known as a bell curve. While FIG. 1 is normalized to a sinusoidal shape, in the real world, the shape may be dramatically different. For example, various types of motors may have a fairly steady power output when confronted with a range of counter torque loading on their shaft. However if the applied counter torque loading continues to increase; the power out may diminish very quickly to zero, graph point 110. FIG. 1 covers a wide range of force that a load may place on the driving motive source. It demonstrates that there is an optimal useful power transfer that occurs from the motive power source to the useful power form: electrically generated power as shown between 7 and 9 in FIG. 1, graph points 104 and 108. The numbers in FIG. 1 are normalized and could be any value depending upon the wide range of applications to which the present invention applies. As the force applied by the load is increased, the product of the distance through which the force or torque travels in a certain amount of time, results in generated power out that reaches its peak magnitude at an applied force of 8 in FIG. 1, graph point 106. Any increase of counter torque loading or force applied by the generator to the driving motive power source results in diminished transfer of power or diminished efficiency of the electrical power generation system.

It needs to be understood that varying the counter torque that a generator may present to a motive power source is only one power transfer parameter of many that can be varied, increased or decreased, to optimize the efficiency from which power is transferred from the driving motive power source to system power output, in this case electrical power.

Power Transfer

The present invention teaches that optimal matching of a power generating system's components is required to attain maximum power and efficiency from the system. Optimal matching must incorporate all aspects influencing the production of power whether it is the source of power, the load, power transfer parameters or the electromechanical resistance offered by a generator. Optimization is achieved by adjusting, increasing or decreasing, power transfer parameters to maximize generated power output based on power sampling, a dynamic process that is applied throughout the life cycle of the system. If the conditions on the generation system change, (such as increased motive power, decreased power, RPM or torque characteristics due to change in quality of fuel, etc) force and other loading parameters of the generator and other power transfer parameters can be dynamically increased or decreased so as to provide maximum power transfer from the motive power source of the system to the desired usable form of electrical power output by the power generation system.

FIG. 3

FIG. 3A, FIG. 3B and FIG. 3C show a single flow chart of a first embodiment of the method of the invention. They are presented on separate pages: 3/9, 4/9, and 5/9. The controller may be divided into three subsystems based on their function within the system. The Index of the Reference Numerals for FIG. 3, associates each subsystem with a range of reference numerals along circuit descriptions and labeling that also correspond to those given in FIG. 5 and those given in the detailed circuit descriptions of Table One. The controller subsystem grouping applies to FIG. 5 and Table One detailed circuit descriptions.

| Controller Subsystem | Controller Function | Reference Numerals |
|---|---|---|
| "Load Engaging System" | Power transfer parameter engagement: | 302 to 322 |
| "Load Selecting System" | Power transfer parameter selection: | 324 to 330 |
| "Load Optimizing System" | Power transfer parameter optimization: | 332 to 346 |

FIG. 3: Power Source

Start engine step 302 indicates an engine being started, for example a generator engine, a vehicle engine, a power plant engine or any source of thermodynamic power. In other embodiments, this engine may be a solar plant, windmill, turbine or other power source or any device that is used to perform mechanical work. Most engines, even reciprocating engines, being cyclic such that an engine speed in revolutions per minute (RPM) then exists, which may be measured by a sensor in order to generate an engine RPM signal with a value that may be continuously monitored, step 308. A "turn on" speed value is set in step 304. A "turn off" speed value is set in step 306. The "turn off" value has to be a lesser value than the turn on value.

FIG. 3: Load Engaging

In step 310 the RPM or speed value is continuously compared to the "turn on" speed, which was set in step 304. If the "turn on" value has been exceeded, the flow of control will proceed to step 312. If the turn on value has not been exceeded, the load, an alternator/generator load and other loads, torques, counter torques or forces will remain off, (or in their minimum load state), and the flow of control will continue testing engine "turn on" speed, step 310.

In step 312, RPM or speed value is also continuously tested for the "turn off" speed value, which was set in step 306. If the engine speed is greater than the "turn off" speed the flow of control will go to step 316, where if applicable, the load selector will be initialized for its startup sequence. If at any time the engine speed is less than the "turn off" threshold, step 312, the flow of control will go to step 314, "Load Shedding", which will remove the alternator and other loads and may reset power transfer parameters. The cycle may begin again at step 310.

It is important to understand that engine speed continues to be monitored for "turn on" and "turn off" speed values while the system is on, steps 308, 310 and 312. Also, note that the "turn on" and "turn off" values cannot represent equal speeds because this leads to ambiguity. Other properties of the power generating system operation may be measured, for example: speed of ignition, frequencies associated therewith, air input or output, fuel input and so on; numerous measures of engine operation speed or combinations of those measures may be used in the invention. This signal may be digital, or it may be analog with frequency or amplitude or another property proportional to the engine speed.

FIG. 3: Load Selecting Initialization

The initialization process happens only with a transition from "optimization off" to "optimization on" beginning with initializing the "Load Selecting Circuit" to start optimizing a certain load or power transfer parameter setting, while all other load or power transfer parameter settings, and application of those settings are held constant, step 316. In a simple system, where the only parameter being optimized is the generator load, a "Load Selecting Circuit" is not needed and this step will be omitted.

Load/Force Versus Power Transfer Parameter Initialization

The preliminary application loads, torques, counter torques, forces controller settings are generally initialized at the minimum or zero load setting, graph point 102, or a greater setting in step 318 and will be increasing towards maximum power transfer, graph point 106. Power transfer parameters may be initialized to be either increasing or decreasing towards maximum power transfer.

Generator as a Power Transfer Parameter & Settings

The electricity-generating device is a required component in any electrical power generation system and may apply a load or torque to the power generation system that may be configured as a power transfer parameter. This may be implemented with a continuously variable transmission or by varying the electromechanical load that the generator presents to the driving motive force.

If the generator load or torque provided is configured as a power transfer parameter to a power generating system, where the load is increased or decreased to optimize the transfer of power, it needs to be emphasized that the settings of the generator load controller must be made with precision. It is the generator/alternator load that will apply the most resistance force to the driving power motor as compared with the other parameters being optimized, and therefore it will have the greatest influence on the system. The initial load settings and rate of change setting may ensure a smooth transition when the generator load is engaged. Note that initial settings can be set for different applications. Also, it is important to realize that the rate of load or power transfer parameter change, increasing, decreasing, is adjustable and may be set by a "Load Controller Circuit" to ensure a transition that is appropriate for the device being controlled.

Load Engaging System: Generator as a Power Transfer Parameter

One way to conceptualize the influence of the generator load configured as a power transfer parameter is that the loading force working in the system should be able to stall the driving motive force. The generator should be of sufficient size relative to the system such that it can stall the driving motive force to ensure that the system is able to exceed the counter torque load that will return the most power and that the system is robust. If there was not a specific initialization loading force, a random maximum load could be applied that would either shock or stall the system. In most applications, the load controller will start by setting the power transfer parameter(s) at a predetermined setting to create a transition from "no load" to "load adding". In the case where the power transfer parameter is a load, torque, or counter torque or force such as that applied by the variable generator/alternator, a low or minimal setting of the load may be initially applied to create a smooth transition from "no load" to "load adding" step 322. As has been already stated, problems will occur if the generator loading counter torque begins at the maximum setting and decreases in the direction of maximum power transfer. Therefore, it is only logical that loads, forces, torques or counter torques being optimized on start up, are initialized at predetermined minimum load settings and be increasing towards the direction of maximum power transfer, graph point 106, step 320.

Load Engaging System: Initial Power Transfer Loading

Figure 2:
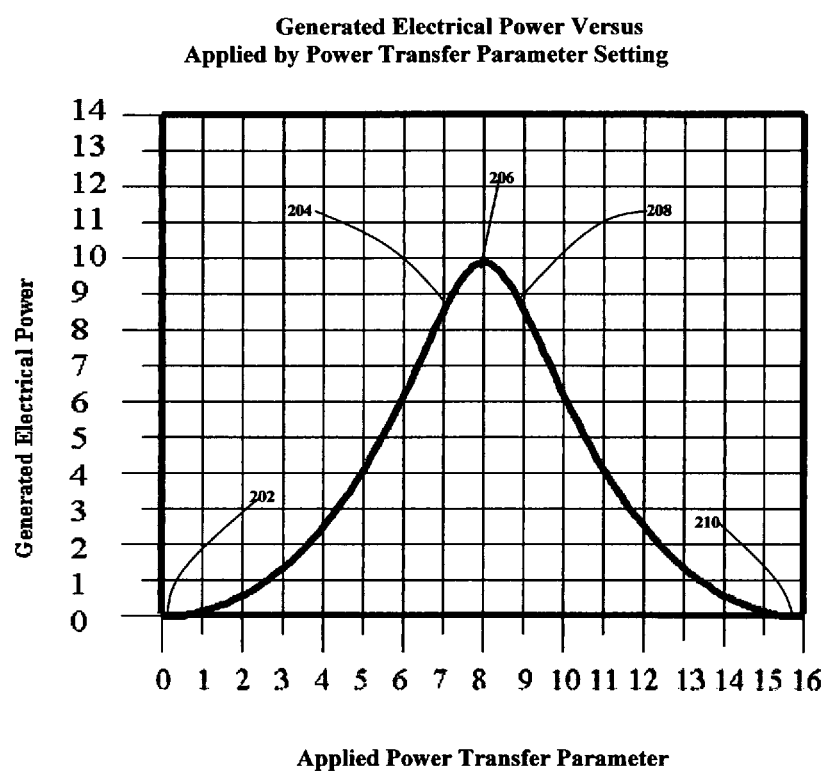
FIG. 2 is a chart of generated power versus application setting of power transfer parameters.

As has been already stated, in a power generating system there can be many different power transfer parameters such that their application, increasing or decreasing will increase or decrease the amount of generated power. These are generally different in nature than a load, torque, counter torque or force. FIG. 2 is a chart of generated power versus application setting of power transfer parameters, showing examples:

- A generally preferred application of a specific power transfer parameter or setting may begin at a maximum application, graph point 210, or at a lesser setting, and decrease to achieve maximum power transfer, graph point 206.
- A generally preferred application of a specific power transfer parameter or setting may begin at a minimum application, graph point 202, or a greater setting, and increase to achieve maximum power transfer, graph point 206.
- A generally preferred application of a specific power transfer parameter may not have a predetermined initial setting: for example temperature.

It may be seen that in general, maximum power transfer will occur in a narrow band around point 206. Merely as an example, operations between points 204 and 208 may be considered desirable, while operation near points 202 or 210 would be undesirable. However, optimization close to point 206 is the desirable outcome, while merely avoiding the region of points 202 and 210 would be of less interest.

Returning to FIG. 3, at FIG. 3A, there are many advantages to having a set "turn on" and set "turn off" capability. It allows the engine or power source to have a generator/alternator load free start up based on RPM or speed. It also allows the application of other power transfer parameters once the "turn on" threshold speed has been reached. This reduces the loading and related wear on engine start up equipment such as starters. A load free startup reduces the chances of the engine stalling on start up because the loads are applied at a desired RPM where the engine is stable. This applies particularly to thermal dynamic engines but applies to other applications as well. It also allows the engine to reach a desired RPM or speed quickly (load free). This has a performance advantage: for example if there is a power band that should be reached, it will reach that power band faster without the generator/alternator load. It offers flexibility in selecting a loading RPM that can vary between applications and may vary also with different engines.

It is also important to be able to set a speed at which the generated load will be disengaged, step 306. For example, a turbine should run at a certain speed to run efficiently. Another example is that certain engines need to be run at a certain speed and, to prevent damage, cannot be loaded below a designated speed. Also, it provides a means to quickly remove generator/alternator loads and other applied loads, forces, torques, counter torques and power transfer parameters influencing the system to aid in preventing a possible power source engine stall.

Generator Types: RPM/Speed Actuated Generator/Alternator Configuration

Advantages to having a set "turn on" and set "turn off" capability of the "Load Engagement System" are illustrated by comparing FIG. 6A, a movement or RPM actuated generator/alternator to FIG. 6B a conventional generator/alternator. A RPM or speed activated cooled alternator, FIG. 6A, is a mechanically driven electric generator/alternator that is configured such that when a variable electrical current flows through conductors that are electrically insulated and formed as coil windings located in the rotor, it produces a magnetic field that may vary in intensity, that slices through the stationary set of electrically insulated conductor coil windings located in the stator 602, generating an electrical current as the mechanical input causes the rotor to turn. The variable electrical current is enabled and flows only when the set "turn on" threshold or speed has been reached, causing a magnetic field in the insulated field windings, whereby the alternator produces electrical power. Below the set "turn off" threshold, electrical current ceases to flow through the generator's/alternator's windings and there is no magnetic field to generate electrical power.

The generator/alternator of FIG. 6A has a cooling system that cools the generator/alternator field windings that is mechanically driven by turning the generator's/alternator's rotor shaft, having a device such as fan blades, or a pump, which forces coolant, that may be air, gas or liquid, past the rotor and stator windings cooling them by carrying heat away from the insulated windings, which may be further cooled by other mechanisms such as a radiator. Forced cooling is applied to generator/alternator conductors and field windings only when the generator/alternator rotor shaft is turning.

In the "RPM Actuated Generator/Alternator Configuration", insulated electrical conductor winding heat buildup is controlled by engaging or disengaging the electromechanical load, torque, counter torque and force produced by allowing or disallowing heat producing electrical current to flow through the rotor winding conductors that are formed as coils. Enabling and disabling of alternator field winding current is based on continuous monitoring of the RPM or the speed, and the set "turn on" and set "turn off" RPM or speed threshold are such that the "turn off" threshold setting is a lesser RPM or speed than the "turn on" setting to ensure the application of sufficient forced cooling. The RPM or speed based "turn on" and "turn off" capability is a function of the "Load Engagement System".

This configuration has major advantages over a conventional generator/alternator:

a. It allows heat producing electrical current to flow into the rotor windings only when the generator/alternator is moving and providing cooling to the rotor windings.

b. This cooling enables the rotor windings and other generator conductors to carry more heat generating current than they would if they were built knowing that electrical current would be applied when the generator/alternator is not moving: conductor amperage rating/capacity is increased.
c. The rotor, 608, of the RPM or speed actuated generator/alternator, can be made smaller than that of the conventional alternator, 616, because it does not have to depend on having surface area to dissipate heat caused by electrical current in the event the generator/alternator is not turning.
d. Since the rotor 608, can be made smaller, more magnetic flux or magnetic lines of force, 604, will not have to cut through the rotor, 608, and be applied to the stator field windings, 606, increasing generator/alternator efficiency. It is important to observe that though both the "RPM/speed actuated generator/alternator" and the conventional generator/alternator are the same size, the proportions are different. Many more magnetic lines of force, 612, are inefficiently applied to the larger rotor, 616 (and end up applied to the stator field windings 614) of the conventional alternator, whereas with a smaller rotor, 608, more magnetic lines of force, 604, are applied where they will be used to produce electricity in the stator, 602.
e. The RPM/speed actuated generator/alternator protects the field windings, 604, from overheating and possibly burning if current is applied and there is no forced cooling because the alternator is not turning.
f. It is also efficient. It is a waste of power to apply current to the field winding if the engine is not turning the alternator since no generated power will be produced.

In more detail, the RPM/speed actuated generator/alternator configuration of the invention has the following characteristics:
1. The generating device is a mechanically driven alternator such that when a variable electrical current flows through conductors that are electrically insulated and formed as coil windings located in the rotor, it produces a magnetic field that varies in intensity, that slices through the stationary set of electrically insulated conductor coil windings, located in the stator, generating an alternating electrical current as the mechanical input causes the rotor to turn.
2. A cooling system that cools the alternator field windings that is mechanically actuated by turning the generator/alternator's rotor shaft, having a device such as fan blades, or a pump, which forces coolant, that may be air, gas or liquid, past the rotor and stator windings cooling them by carrying heat away from the insulated windings, which may be further cooled by other mechanisms such as a radiator.
3. A means to engage or disengage the electromechanical load, torque, counter torque and forces produced by allowing or disallowing heat producing electrical current to flow through the rotor winding conductors that are formed as coils, based on continuous monitoring of the RPM or the speed, and the set "turn on" and set "turn off" RPM or speed threshold are such that the "turn off" threshold setting is a lesser RPM or speed than the "turn on" setting to ensure the application of sufficient forced cooling.
4. Having a "turn on" and a "turn off" feature, which allows removal, application or variation of the load and thus has the following advantages:
   a. Ability to carry more heat causing electrical current because the generator/alternator field winding current will not flow until the generator/alternator RPM or speed is sufficient to equal or surpass the "turn on" threshold which in turn assures that the rotor actuated cooling described is cooling the alternator's rotor and stator windings.
   b. The size requirement of the RPM/speed actuated generator/alternator rotor is such that it can be made smaller and have a smaller rotor diameter than the rotor of the prior art conventional generator/alternator, because it does not need to dissipate heat buildup from electrical current occurring when the alternator is stationary without the aid of forced cooling.
   c. The rotor of the movement actuated generator/alternator may have a smaller diameter, using less construction material and weighing less while having the same rotating rotor current carrying ability as compared to the prior art conventional alternator.
   d. Generator/alternator rotor winding efficiency is increased because the rotor now has a diminished diameter requirement and therefore a diminished electrical current requirement; more magnetic flux generated by electrical current flowing through the rotor conducting coil windings in the rotor now is cutting through more of the stator insulated conductor windings, the insulated conduction windings that generate power.
   e. It may protect the field windings from overheating and possibly burning because electrical current is applied only when the alternator has reached a speed or RPM where there is sufficient "forced cooling".
   f. It is also efficient since it is a waste of power to apply current to the field winding if the driving motive source of power is not turning the generator/alternator because no power will be generated.

Returning to consideration of FIG. 3B, in the presently preferred embodiment and best mode presently contemplated for carrying out the invention, the controller may use a two state operation regime in which one load or power transfer parameter at a time is isolated and selected for optimization in a configuration that optimizes more than one power transfer parameter: a Load Selecting System. Through this process power transfer parameter settings may begin at a predetermined applied value and a direction of increasing or decreasing applied, step 320, when a transition from "turn off" to "turn on" occurs based on continuous monitoring of the RPM or the speed of the source of power. Optimization is implemented through increasing or decreasing one power transfer parameter at a time, to move towards system being optimized towards maximum power transfer, while holding the application of other power transfer parameters constant in their last position, isolating its effect on generated power.

The next step "load adding" is where all of the loads and power transfer parameters are enabled (if applicable), step 322. This enabling of all optimization parameters actually provides the capability of a quick load disengaging.

Step 324 monitors the load selection move on criterion of the Load Selection System (load selector circuit). The move on criterion (criteria as the case may be) may be a count of clock pulses reflecting the number of power samples taken (as depicted in FIG. 5 and discussed later in reference to that Figure), or it could be a count for a period of time that has elapsed or a reduced rate of power change indicating the power is close to the peak of the of the "bell" (FIG. 1) or other criteria.

Step 326 tests the move on criterion, monitored in step 324 to determine if the selected power transfer parameter should continue to be optimized, or if the next parameter needs to be optimized. If it is determined that the selected power transfer parameter needs to be optimized, the cycle will repeat itself by retrieving a new power sample, step 332.

If step 326 determines that the next power transfer parameter needs to be optimized, before engaging the next load controller, the present load controller stops optimizing or changing its load or power transfer setting in memory. The value in memory ceases to increase or decrease as the case may be. Its optimized value is frozen in place, and is applied and persisted to the power generation system as a constant before the new load or power transfer parameter is optimized, so that the new load or power transfer parameter being optimized will not be influenced by changes in other power transfer parameters influencing the generation of power, step 328. This is accomplished in step 328 through a retention/memory of the load or power transfer parameter value that is converted into a physical value that manipulates the load or power transfer parameter. The next load/parameter to be optimized is then selected in step 330. The flow of control returns to step 324.

Power sampling, step 332, is implemented with a device operatively connected to the "Load Optimizing System" that samples system output power and transmits this information back to the "Load Optimizing System". Power sampling, step 332, may constitute formal sampling, for example in A/D format, or it may simply comprise continuous measurement, timed measurement and so on. In order to make its "decision" on either generator loading or other power transfer parameters, the "Load Optimizing System" should determine if system output power is increasing or decreasing as a result of the direction of the power related parameter being optimized. In order to do this a "present" (or more recent) power sample and a "past" power sample are necessary. To create a "past" power sample the system stores the sample, step 334, and retrieves it subsequently, step 336.

In order to make a determination of the direction of power, the past sample is compared to the present sample. If the present power sample is greater than the past power sample, power is increasing. If the present power sample is less than the past power sample, then the power is decreasing.

Once the power direction has been determined, a flow decision has to be made, step 338. If the power is increasing, the direction (increasing/decreasing of the power transfer parameter) is kept, step 340, and the cycle begins again by testing the "move on criterion" step 324. The direction of the parameter being optimized is seen to be moving in the proper direction. To briefly revert to FIG. 2, an increasing power reading indicates that the direction of change of the load is moving towards the peak of the "bell", in the bell chart, to the optimum area near point 206. The power transfer parameter being optimized may either be increasing or decreasing to create an increase in system power output.

If the generated electrical power direction has been determined to be decreasing, step 338, the direction of the power transfer related parameter must be reversed, step 342. It is important to realize that as a power transfer related parameter is being optimized, there will be a point in the adjustment of the parameter where the optimum point of power transfer is attained. Additional correction in the same direction, either increasing or decreasing, will result in diminishing power transfer with a net result of less generated power as illustrated in FIG. 1 and FIG. 2. The flow of events will bring the system to step 342.

Step 342 changes the direction of the parameter being manipulated in memory. It is important to recall that in order to change a direction, the previous value of that direction has to be established/retained, so as to allow a determination to be made either to continue in the same direction or to change direction.

A key point to note is that the "Optimal Load Controller Method and Device" optimizes different loads and power transfer related parameters, using the properties of the "load controllers" that are able to memorize/retain and apply a load setting that is either dynamic (being optimized) or static (has been optimized) from one source of information, a device sending information about the magnitude of system power output (also, see Table One: Alternator Load Controller Circuit & Generic Load Controller Circuit). In order to optimize a power transfer parameter, the load controller must be able to increase or decrease from that setting in memory at a predetermined rate that is appropriate for the power transfer parameter being manipulated, step 344. The other function of the load controller is to apply the load setting in memory to a medium that can physically apply the power transfer parameter being manipulated to the power generating system, step 346. The power optimization cycle is complete and the flow of control returns back to step 324 beginning another cycle.

This configuration accomplishes several things. By measuring/sampling system output power, what is actually being measured/sampled is not just the parameter being optimized, but the parameter being optimized relative to its (the load's force, parameter power transfer property's) effect on the whole system. As mentioned earlier with the motor alternator system example, a motor or a generator by itself will have its own optimal performance characteristics (such as RPM power relationships). Once they are tied together in a system, such as a motor driving a generator, the optimal performance parameters will change because one unit (the motor) will affect the performance of the other unit (the generator).

FIG. 4

FIG. 4 is a block diagram at a high level of abstraction of a second embodiment of the device. The mechanical power source 402 may be a turbine, an engine, a windmill, a wave energy device or any device that is used to perform mechanical work. Power transfer 404 may be visualized as a drive shaft allowing the motive device 402, to spin a continuously variable speed transmission 406. The continuously variable transmission 406 is merely an example, however: a wide range of devices may be used. The continuously variable speed transmission 406 configures and transfers power originating from the motive device 402 via power transfer 408, for example another drive shaft, to the variable load electricity-generating device 410. The continuously variable speed transmission and the variable electrical generating device are power transfer devices that present power transfer parameters that will be optimized by the "Optimal Load Controller Method and Device" in this configuration.

However, in alternative embodiments the power transfer 404, 406,408 may itself be electricity, or may be hydraulic and so on, and the load 410, may be a device other than an electricity generator.

RPM sensor 412 sends a signal 414 to the controller 416 that decides if to add one or more load(s), load adding, or to shed a load(s), load shedding, or maintain a load(s) that are placed on the generator based on engine speed. If the engine speed has met, or maintained the "turn on" threshold speed or a greater speed, then the controller will "decide" to add or maintain the power transfer parameters. If the engine speed is below the "turn on" threshold, the controller will remove loads. Adding/enabling and removing/disabling loads and other power transfer related parameters may be implemented electrically with a relay or by other means.

If there is a transition from off to on, various load control parameters will need to be initialized. The load selector 420 is signaled 418 by the controller 416 to initialize its settings (for example: start with generator load 410 or perhaps other parameters that are configuration dependent). The load selector 420 sends an "enable signal" 422 or 424, to enable one of the load controllers 434 or 436. It is important to realize that only one load or power transfer parameter can be optimized at a time; one power transfer parameter is enabled or selected for optimization. All of the other power transfer parameters, that are to undergo optimization, are held at their last optimized power transfer setting until they are selected. The load selector will move on once its move on criterion (or criteria as the case may be) has been met: such as a certain count of optimization cycles has passed.

The "Load Selecting System" is being used in this configuration to demonstrate more than one power transfer parameter being optimized. In a system where there is only one power transfer parameter such as a variable load electrical generator, a "Load Selection System" is not needed.

The load controllers 434 and 436 are signaled (signals 426 and 428 from controller 416) to be initialized and to apply a certain load setting upon start up that may have a power transfer direction of increasing or decreasing towards maximum power transfer, FIG. 2, graph point 206. Loads, torques, counter torques and forces are generally initialized to be increasing in the direction of maximum power transfer. However, power transfer parameters may be initialized to either be increasing or decreasing in the direction of maximum power transfer, as appropriate. Lastly, the load controllers apply or remove loads based on RPM or speed with load adding/load shedding signals 430 and 432.

Once initialized, "The Optimal Load Controller Method and Device" is in its run mode and will continue optimizing power transfer parameters until the engine speed declines below the minimum run speed threshold. Optimization is implemented by obtaining an output power sample from a power measuring device 438 and sending it 440 to the controller 416. System power output can be measured several ways using different approaches. Some measurements that may be sampled to indicate increases and decreases of system power output would include voltage, amperage, temperature, torque, force, rpm, and speed.

The controller's "Load Optimizing System" determines if the power is increasing or decreasing. It does this by creating a past power sample by storing a current power sample and retrieving it later. The past power sample is compared with the current power sample. If the past power sample is greater than the current power sample, the power is determined to be decreasing. If the present power sample is greater than the past power sample, the power is increasing.

If the power is increasing, the direction of load control, increasing or decreasing, is maintained by the "selected" load controller signals 442 and 444 to load controllers 434 and 436. If the power is decreasing, the direction of the load control is reversed with signal 442 and 444. Another cycle beginning with taking a power sample from the power sensor 438 optimizes further the current power transfer parameter that is controlled by either one of the load controllers 434 or 436 unless the load selector 420 "move on criterion" signal 446 has been met. If this is the case, the current optimization setting of the load controller in memory is "frozen". It should be noted that the retention/memory of a load position does not necessarily have to be implemented electronically. The application of the now static "load setting" in memory is persisted and applied to the current power transfer parameter. The next load controller is selected by the load selector 420 to begin optimizing the next power transfer parameter. It is important to realize that by optimizing only one power transfer parameter at a time that parameter's effect on power output is isolated.

FIG. 5

FIG. 5 is a block diagram of a third embodiment of the device. This diagram is one step lower in abstract than FIG. 4, showing what is merely one possible example of how the circuits may be structured. Numerous variations are possible within the scope of the invention.

The mechanical power source 502 may be a turbine, an engine, a windmill, a wave energy device or any device that is used to perform mechanical work. Power transfer 504 may be visualized as a drive shaft allowing the motive device 502 to spin a continuously variable speed transmission 506. The transmission 506 configures and transfers power originating from the motive device 502 via power transfer 508 (for example: another drive shaft) to the variable load electricity-generating device 510.

However, in alternative embodiments the power transfer 504, 506,508 may itself be electricity, or may be hydraulic and so on, and the load 510 may be a device other than an electricity generator.

"Engine RPM Signal Circuit" 512 senses engine speed and sends a signal 514, a signal which "RPM Signal Circuit" 512 may well rectify, modulate, digitize or otherwise alter before sending a signal 514 to "On Off Circuit" 516. "On Off Circuit" 516 will "decide" if to add the load(s) or other power transfer parameters, load adding, or to shed a load(s) or other power transfer parameters, load shedding, or maintain a load(s) or other power transfer parameters placed on the generator based on engine speed. If "Engine RPM Signal Circuit" signal frequency 514 exceeds that of "Set Oscillator" frequency of "On Off Circuit" 516, or maintained "Engine RPM Circuit" signal frequency 514 exceeds the "turn on" threshold frequency, then "On Off Circuit" 516, will "decide" to add or maintain all applicable power transfer parameters/loads using signal lines 518 and 520. If "Engine RPM Circuit" signal 514 is below the "turn off" threshold, set by the variable oscillator and other circuit parameters, "On Off Circuit" 516 will remove the loads using signal lines 518 and 520. Adding/enabling and removing/disabling loads and other power transfer parameters may be implemented electrically with a relay or by other means.

If there is a transition from off to on, various load control parameters will need to be initialized. "Load Selector Circuit" 536 is signaled 524, by "On Off Circuit" 516 to initialize its settings. For example: start by enabling the transmission "Load Controller Circuit" 538 in order to begin by optimizing the generating device load 510 or perhaps other power transfer parameters that are configuration dependent. "Load Selector Circuit" 536 sends an enable signal 532 to "Load Controller Circuit" 538 or an enable signal 534 to "Alternator Load Controller Circuit" 540. It is important to realize that only one load or power transfer parameter can be optimized at a time. All of the other power transfer parameters that are to undergo optimization are not enabled and held at their last power transfer setting until they are selected. "Load Selector Circuit" 536 will select the next power transfer parameter to be optimized once its move on criterion has been met. In this implementation the move on criterion is a certain count of optimization cycles that have passed. Other implementations may use other move criteria such as a certain amount of time that has passed.

"On Off Circuit" 516 sends a signal 522 to "Load Control Reset Circuit" 526 indicating when a transition from off to on has occurred based on RPM or speed. "Load Control Reset Circuit" 526 processes signal 522 and sends two initialization signals for this implementation: 528 and 530. Signal 528 signals "Load Controller Circuit" 538 and signal 530 signals "Alternator Load Controller Circuit" 540 to apply a predetermined power transfer parameter setting and a direction, increasing or decreasing, towards maximum power transfer.

"Load Controller Circuit" 538 and "Alternator Load Controller Circuit" 540 retain the direction of load, increasing or decreasing in memory, and therefore retain the initialized direction, increasing or decreasing, in memory as well. "Logic Circuits: A and B" 558 control the direction, increasing or decreasing, through signal lines 560 and 562 of "Load Controller Circuit" 538 and "Alternator Load Controller Circuit" 540. The direction of loading, increasing or decreasing, is applied with signal lines 560 and 562 to "Load Controller Circuit" 538 and "Alternator Load Controller Circuit" 540. A signal is sent over lines 560 and 562 when the power transfer application direction needs to be reversed. During initialization, the initialized power transfer direction is applied until "Logic Circuits" signal a reversal of direction to the enabled load controller, 538 or 540.

Once start up parameters have been initialized, the "Optimal Load Controller Method and Device" is in its run mode and will continue to optimize power transfer parameters until the engine speed declines below the minimum run speed threshold.

Dynamic optimization is implemented by obtaining an analog power sample from the "Power Sensor Circuit" 542, measuring system output power, and sending the signal 544 to "Power Comparator Circuit" 554, where it is digitized. "Power Comparator Circuit", 554 determines if the system output power is increasing or decreasing. It does this by creating a "past power" sample by storing a digitized current power sample and retrieving it from memory later. This rate of process is controlled by oscillator 548, which sends a clock signal 550 to "Delay Timing Signal Circuit", 546 and also to "Load Selector Circuit" 536. Note that oscillator 548 is actually a part of "Delay Timing Signal Circuit" 546, and is drawn separately in FIG. 5 for easy understanding of its dual purpose. The "Delay Timing Signal Circuit" 546 provides the correct signals for the memory integrated circuits to store and retrieve digitized samples sent on 552. The retrieved past power sample is compared with the current power sample. If the past power sample is greater than the current power sample, the power is determined by "Power Comparator Circuit" 554, to be decreasing. If the present power sample is greater than the past power sample, "Power Comparator Circuit" 554 determines that power is increasing. There is a possibility that the past sample is equal to the digitized present sample leading to an ambiguous result for the purpose of optimization.

The result of the power comparison is sent as a signal 556 to "Logic Circuits: A and B" 558. "Logic Circuits: A and B" 558, can be broken down into two parts: "Logic Circuit A" and "Logic Circuit B". "Power Comparator Circuit" signal 556 is processed by "Logic Circuit A" to eliminate the ambiguous possibility that the past sample equals the present sample. If the past sample equals the present sample, the last known unequal power direction (past power sample is greater than present power sample, or present sample is greater than past sample) information is maintained and passed along to "Logic Circuit B". If the past and present power samples are unequal, the result is simply passed on to "Logic Circuit B". "Logic Circuit B" makes the actual decision either to increase or decrease the selected power transfer parameter. If the power is increasing, the selected load controller, either 538 or 540, through signals 560 or 562, maintains the direction of loading: increasing or decreasing. However, if "Power Comparator Circuit" 554 determines that the power is decreasing, the direction of the power transfer parameter is reversed by "Logic Circuits A and B" 558 and a signal, 560 or 562, changes the power transfer parameter direction of the selected controller 538 or 540.

In order to increase or decrease the direction of the load setting, the load controllers, such as 538 or 540, have to be able to remember/retain the past position and then add or subtract from that load or power transfer parameter position at a controlled desirable rate. Once enabled by "Load Selector Circuit" 536, "Load Controller Circuit" 538, or "Alternator Load Controller Circuit" 540, accept the increase/decrease signal 560 or 562, from "Logic Circuits" 558 and apply that direction at a specific rate that is controlled by a variable oscillator located within the "Load Controller Circuit" 538, and "Alternator Load Controller Circuit" 540. The variable oscillator permits the adjustment in the rate of power transfer application, increasing or decreasing, loading performed during optimization offering the flexibility to "tune" the load controller for a specific power transfer parameter application. Other means to adjust the rate of increase/decrease of a power transfer parameters could include but are not limited to controlling the rate of an electrical servomotor, controlling voltage, electrical resistance, and fluid flow parameters.

As shown in FIG. 5, "The Optimal Load Controller Method and Device" can be configured to control more than one power transfer parameter, as illustrated. It is able to achieve optimization by isolating and optimizing one power transfer parameter at a time; all other power transfer parameters are held in their last position. Therefore, load controller circuits, 538 and 540, also must have the ability to be enabled and disabled by "Load Selector Circuit" 536 in order to isolate one load at a time.

The ability to "remember" the load setting is a quality that also comes into play when more than one "Load Controller Circuit" is to be used. Each "Load Controller Circuit" that is disabled, not being increased or decreased, must be able to retain/remember the load or power transfer parameter setting while only one "Load Controller Circuit" optimizes a power transfer parameter dynamically. Finally, "Load Controller Circuit" 538 and "Alternator Load Controller Circuit" 540 must be able to apply the power transfer parameter setting to the power generating system in either a static mode or in a dynamic mode. "Load Controller Circuit" 538 and "Alternator Load Controller Circuit" 540 maintain the same load setting after being optimized until selected to be optimized again.

Another cycle, beginning with taking an output power sample from the "Power Sensor Circuit" 542 optimizes further the current power transfer parameter that is controlled by either one of the controllers, 538 or 540, unless "Load Selector Circuit's" 536 "move on" criterion has been met. The move on criterion may be implemented by using oscillator 548 and a counter to count the number of oscillator pulses, and therefore the number of "power samples", because oscillator pulses are also controlling the rate of each power comparison cycle through the "Delay and Timing Signal Circuit" 546. Once a certain number of pulses have been counted, the Load Selector Circuit 536 will select the next load controller circuit to optimize the next power transfer parameter.

If the move on criterion has been met, the current optimization setting of the controller circuit, 538 or 540, in memory is "frozen". The application of the now static "load setting" in memory is persisted and applied to the current power transfer parameter. "Load Selector Circuit" 536 enables the next controller, either 538 or 540, to begin optimizing the next power transfer parameter.

The "Load Selector Circuit" 536 apart from acting in conjunction with controller circuits 538 and 540 to switch in and out loads and power transfer parameters to be optimized, also serves as a means to conserve circuitry or devices. Note how "Load Selector Circuit" 536, "Power Sensor Circuit" 542, "Delay Timing Signal Circuit" 546, "Power Comparator Circuit" 554, "Oscillator" 548 (part of "Delay Timing Signal Circuit" 546) and "Logic Circuits: A and B" 558 are all used to optimize different power transfer parameters. The same circuits or devices are being used for different applications! This configuration also makes adding other power transfer parameters relatively easy and inexpensive.

Once again, FIG. 2 is useful to illustrate the process of power transfer optimization and the effect of changing the application of a power transfer parameter on generated power. A power transfer parameter such as a load, torque, counter torque or force, may have its initial setting initialized to begin at graph point 202, or a value less than maximum power transfer and be initialized to increase towards maximum power transfer, graph point 206. However another type of power transfer parameter may also begin at graph point 210 or a value that is greater than graph point 206 and have an initialized setting direction decreasing towards maximum power transfer, graph point 206.

As described, the optimization process will continue the direction of either increasing or decreasing the setting or application of the power transfer parameter until it reaches maximum power transfer, graph point 206. The direction of power transfer parameter application continues such that it is now either increasing or moving from graph point 206 towards graph point 208, or decreasing and moving from graph point 206 towards graph point 204. As soon as the controller detects system power output to be declining, direction of the application of the power transfer parameter, increasing or decreasing is reversed. This process keeps the power transfer parameter application optimized for maximum power transfer from the power source to the electrical generating device.

It is also important to realize that the process of optimizing system power, from the power source to the system's electromechanical variable load electrical generating device, includes transferring an amount of load, torque, counter torque, force or other power transfer parameters and combinations thereof less than an amount required to stall the driving motive source. As soon as the direction of a power transfer parameter is decreasing the power of the generator in the direction of a possible power source stall, its direction, increasing or decreasing is reversed and system power output once again begins increasing.

The ability of the dynamic quality of the "Optimal Load Controller Method and Device" to optimize one or more power transfer parameters dynamically in response to changes in system power output, makes the system itself extremely flexible such that it is able to adapt to varying conditions placed on the system and system parameters including but not limited to: wear, different fuels or quality of fuels, changes in loads and other power transfer parameters, changes in the load placed on system power out, electrical load placed on an electrical generator and changes in the input power. For example, suppose a higher grade of fuel increases power output of the motive device driving the electromechanical variable load generator, in the same manner as a throttle. The system will then appropriately and automatically adjust the electromechanical load of the generator to seek out maximum power transfer incorporating the new and greater power input by the power source. It is important to note how a change in the quality of a parameter affecting power output, such as the quality of fuel, may require the adjustment of one or more power transfer parameters to attain maximum power output of the power generating system; changes in one power transfer parameter may require optimization of other power transfer parameters.

It should be noted that where one circuit/device is used in the embodiment of FIG. 5, two circuits/devices or more and other circuit/device configurations may be implemented to achieve the same function as the circuit block heading. For example, one oscillator could be used along with a counter, or multiple counters instead, to access different frequencies required of the system. Other parts of the system may, if desired, be made redundant. Note in particular that more than one type of power sensor may be used. For example: engine temperature or turbine pressure or wind speeds or the like may be measured.

Table One discusses another alternative embodiment of these circuits in greater detail.

TABLE ONE

Engine RPM Signal Circuit

Create engine speed signal that has a frequency proportional to the driving engine speed.

On Off Circuit

The purpose of the "On Off Circuit" is to provide a flexible means to
select and continuously monitor an engine speed at which to apply and remove the generator electromechanical load and other power transfer related parameters/loads to and from the driving motive source.
    There is a "turn on" or apply load(s) RPM "set value" and a "turn off" or remove load(s) RPM "set value".
    This is implemented by comparing the RPM signal created by the "Engine RPM Circuit" to the signal of a variable set oscillator to provide a "turn on" RPM set point.
    The "turn off" set point is based on the "turn on" set point.
        The "turn off" set point is implemented by making it an RPM value that is less than the "turn on" RPM value and is adjustable.
        It is important to realize that the "turn off" set point has to be a value less than the "turn on" set point to avoid ambiguity.
    If the frequency of the "Engine RPM Signal" is higher than the set oscillator the generator/alternator load, and other power transfer parameters are enabled/applied where applicable.
    If the frequency of the Engine RPM Signal is lower than the "Set
On Off Oscillator" the generator/alternator load, and other power
transfer parameters are disabled/removed where applicable or may also be set to a minimum.
    Enabling or disabling loads may be implemented electrically with a relay or by some other means.
In order to control the load, the system has to "know" when the load has been applied or removed. The "On/Off Circuit" creates a short signal to initialize circuits once the accelerating engine RPM exceeds the "turn on" speed threshold indicating a transition from off to on.
If the engine RPM value remains above the "turn on" threshold, the "Optimal Load Controller Method and Device" will begin optimizing power transfer parameters for maximum power transfer from the driving motive source to generated power out.

Load Controller Reset Circuit

In order to control the load, the system has to "know" when the load
has been applied or removed. The "On/Off Circuit" creates a short signal, sent to the "Load Controller Reset Circuit", to initialize circuits once the accelerating engine RPM exceeds the "turn on" speed threshold indicating a transition from "off" to "on". The "Load Controller Reset Circuit" uses the "off" to "on" transition TABLE ONE-continued signal generated by the "On/Off Circuit" to initialize load controller settings:
  Initialize power transfer parameter beginning application intensity/setting & load controller initialization signal:
    The "Load Controllers" ("Alternator Load Controller", or the "Generic Load Controller(s)") are signaled by the "Load Controller Reset Circuit" to initialize load controllers to apply a predetermined application setting of a power transfer parameter on start up.
  Initialize the direction of the power transfer parameter to be increasing or decreasing towards maximum power transfer. Note that while the figures depict initialization data input to the load controllers, it may in other embodiments be done in the logic circuit
  or a combination of both, or elsewhere.

Power Sensor Circuit

The purpose of the "Power Sensor Circuit" is to convey electrical generated power strength information that can be used by the "Power Comparator Circuit" in the form of a "power strength signal".
  Generated power output changes may be detected in a variety of ways that may be dependent on application such as but not limited to:
    Voltage sensor (voltmeter)
    Amperage sensor (ammeter)
    Temperature sensor (thermistor)
    Power sensor (wattmeter)
    Torque & RPM measurements
    Pressure sensor
  The power-sensing device needs to give information regarding the output power such that the "Power Comparator Circuit" can determine if the power is increasing or decreasing.
  The "Power Sensor Circuit" uses information originating from one "point", in this implementation electrical power from the output of the generator/alternator power generation system.

Power Comparator Circuit

The main purpose of the "Power Comparator" is to determine the direction of system output power: is the power increasing or is the power decreasing and to provide that information to "Logic Circuits A & B", utilizing the following steps:
    Digitize the analog power sample originating from the "Power Sensor Circuit" with an analog to digital converter so it can be stored and manipulated in digital format.
    Determine the direction of power by comparing two samples taken at two different points in time:
      The more recent or "current" sample is taken directly off of the analog to digital converter.
      The older or "past" sample has been stored and then retrieved delaying it in time: it is older than the "current" sample. By comparing two samples taken at different times the "Power Comparator Circuit" can determine if:
        The power is increasing: the more recent measurement is greater than the older sample.
        The power is decreasing: the more recent measurement is less than the older sample.
    The result of the "Power Comparator Circuit" is sent to the "Logic Circuits", or more precisely, first to "Logic Circuit A" for signal processing.

Logic Circuits: A and B

The "Logic Circuits" can be viewed as the "brains" of the system. It takes the result of the "Power Comparator Circuit" and determines the direction of the selected load, which is applied by one or more "Load Controller Circuits".
    The "Logic Circuits" can be divided into two parts: "Logic Circuit A" and "Logic Circuit B"
    "Logic Circuit A":
      The result of the "Power Comparator Circuit" power comparison is received by "Logic Circuit A".
      The digitized sample that has been "compared" by the "Power Comparator Circuits" emits three possibilities:
        The present sample is greater than the past sample
        The past sample is greater than the present sample
        The past sample is equal to the present sample.
      "Logic Circuit A" receives two of those possibilities: present sample is greater than past sample or the past sample is greater than the present sample.
      The third possibility that occurs in a digital format, that present sample is equal to the past sample, is not sent though it is occurring in the Power Comparator Circuit.
      The purpose of "Logic Circuit A" is to eliminate the ambiguous possibility that the past sample equals the present sample. The object of this circuit is to "lock" in a load direction, increasing or decreasing, until the other direction becomes true. If the past equals the present, the last known unequal power direction (past power sample is greater than present power sample or present sample is greater than past sample) information is maintained and passed along to "Logic circuit B". If the past and present power samples are unequal, the result is simply passed on to "Logic circuit B".
    "Logic Circuit B":
      Receives a processed signal from "Logic Circuit A" on the status of the "direction of power".
      Remembers the direction of the load: is it increasing or decreasing.
      "Logic Circuit B" makes the actual decision to change the direction of loading in memory (increase/decrease), which then is applied to the selected power transfer parameter "Load Control Circuit".
        If the power is increasing, the "selected" "Load Controller Circuit" maintains the direction of loading, either increasing
        or decreasing.
        However, if the "Power Comparator Circuit" determines that the power is decreasing, the direction of the load control is reversed by a signal sent from "Logic Circuit B" to the "Load Control Circuit".
        It is important to note that "Logic Circuit B" sends a signal to the "Load Controller Circuit" to change the direction of the load or power transfer parameter only when the power is decreasing.

Alternator Load Controller Circuit

The "Alternator Load Controller" behaves as interface between "Logic Circuits" and the electricity-generating device. It is used to physically control the specific requirements of generator/alternator loading.
  The "Alternator Load Controller" has several different qualities that
    are required of all load controllers to control power transfer parameters:
    Set the direction of the power transfer parameter: since it is an electromechanical load it needs to be increasing towards maximum power transfer.
    It must be able to receive and respond to the power transfer direction result of the "Logic Circuits" increasing/decreasing.
    It must be able to remember/retain the past load or power transfer parameter setting as a reference to increase or decrease from this load or power transfer parameter setting.
    It must increase/decrease the load or power transfer parameter at a specific rate that is appropriate for the system.
    It must be able to be enabled or disabled for optimization. When more than one load is being controlled in a system, the system must be able to enable one load controller and to freeze the position or application setting of all other additional load controllers. Therefore, each load controller must maintain the same power transfer parameter application setting after being optimized until it is optimized again.
    The "Load Controller Circuit" must be able apply the load setting to the load or power transfer parameter being controlled.

Generic Load Controller Circuit (Load Controller Circuit)

The "Generic Load Controller Circuit" serves as interface between "Logic Circuits" and power transfer parameters. It is used to physically control general requirements of power generation system power transfer parameters.
  The purpose of the "Generic Load Controller" is to have one Load Controller Circuit configuration that can be implemented easily to control a wide variety of loads.
  Once "fitted" to control a power transfer parameter using the "Optimal Load Controller Method and Device" it has been labeled in diagrams as "Load Controller Circuit".
  The "Generic Load Controller" has several different functions that are required of all load controllers to control the load or power transfer parameter:
    It will initialize loads or power transfer parameters to be either increasing or decreasing towards maximum power transfer.

TABLE ONE-continued

It must be able to receive and respond to the load or power transfer direction result of the "Logic Circuits", increasing or decreasing.

It must be able to remember/retain the past load setting as a reference to increase or decrease from this load setting point.

It must increase or decrease the power transfer parameter at a specific rate that is appropriate for the system.

It must be able to be enabled or disabled for optimization. When more than one load or power transfer parameter is being controlled in a system, the system must be able to enable one load controller and to freeze the application setting of all other additional load controllers. Therefore, each load controller must maintain and apply the same load or power transfer parameter setting after being optimized until it is selected for optimization again.

The load controller must be able apply the load setting to the load or power transfer parameter being controlled.

The key to having a "Generic Load Controller" is to have a compatible load controller to load interface, which covers a wide range of control interfaces.

There are many different methods used to control a load. What is important is to have outputs that are compatible and easy to interface with common loads or power transfer parameters. This condition is met by providing a wide range of load interface outputs that are commonly used.

The load controller interface outputs that may be used among others are:

5 V: Analog (D/A converter output) that increases and decreases at a predetermined rate.

12 V: Variable analog out that increases and decreases at a predetermined rate.

5 V: 8-bit Digital out

12 V: reversible polarity

Load Selector Circuit

The purpose of the "Selector Circuit" is to provide a means for the "Optimal LoadController Method and Device" to optimize more than one component of the engine/system that it controls.

The configuration of the "Optimal Load Controller Method and Device" lends itself to optimizing multiple loads and power transfer parameters based on sampling system output power at one point.

The "Load Selector Circuit" is used only when more that one power transfer parameter is being used.

The "Load Selector Circuit" provides the ability to control more than one power transfer parameter:

The "Load Selector Circuit" enables one load/parameter to be selected for optimization at a time while all other load controllers are disabled and holding their load position. This isolates the effect of manipulating a power transfer parameter such that a logical decision can be made: to increase or decrease the power transfer parameter setting based on how it influences output power.

The enabled "Load Controller Circuit" can increase or decrease load setting from signals it receives from the "Logic Circuits".

All other load controllers are disabled and hold the last optimized setting.

The "Load Selector Circuit" may receive a signal to be initialized by the "On Off Circuit" to begin with a certain load/parameter to be optimized.

It may select loads sequentially.

END TABLE ONE

In regard to startup, shut down and run modes, the "Load Engaging System" will determine the state of power transfer parameters; how and when they are applied. For example: the device may not have achieved operating performance sufficient to allow it to run against a load, stranding the device near graph point 102 of FIG. 1. The device may also fall below the minimum RPM and load shedding will occur. Under such conditions, temporary removal or alteration of the load is desirable. Table Two discusses the application and removal of loads and power transfer parameters under various conditions.

TABLE TWO

The device and method of the controller may have the following characteristics:

1. Facilitating stall free startup of thermodynamic engines and any power sources used to perform mechanical work in the generation of electrical power by providing a load free startup that is implemented by applying loads, torques, counter torques, forces and other power transfer parameters and combinations thereof at a desired RPM or speed.
2. Applying loads, torques, counter torques, forces and other power transfer parameters and combinations thereof once the power source has reached a predetermined "turn on" RPM or speed reduces the loading, torques, counter torques and forces that may otherwise increase performance requirements in equipment such as the starters that have to exert more force, increase size or weight requirements in these components and increase wear of these components.
3. Applying loads, torques, counter torques, forces and other power transfer parameters and combinations thereof only when the accelerating power source has reached a predetermined "turn on" RPM or speed. This permits thermodynamic engines or other power sources to reach a desired RPM or speed load free and quickly, boosting performance by allowing a power source to reach a predetermined RPM or speed, without the time delay that loads, forces, counter torques, torques or other power transfer parameters and combinations thereof will cause if they were applied sooner.
4. Offering flexibility in selecting a "turn on" RPM or speed that can vary between power generating applications.
5. Offering flexibility in selecting a "turn off" RPM or speed, that can vary between power generating applications, to remove loads, torques, counter torques, forces and other power transfer parameters and combinations thereof only when the decelerating power source has reached a predetermined "turn off" RPM or speed, which may be applied in a variety of applications including: a thermodynamic engine or any power source that may require a minimum engine speed or RPM, a means to quickly remove alternator/generator loading, torques, counter torques, forces and other related power transfer parameter loads, combinations thereof preventing a possible power source or engine stall.
6. The process of optimizing power transfer parameters is inherently stall free; when power is decreasing the selected and isolated power transfer parameter's application direction is reversed to increase system output power.

END TABLE TWO

TABLE THREE

Working Model Description: FIG. 7

Functionally FIG. 7 is the same as FIG. 5. It is configured to test manipulation of one power transfer parameter, torque applied by the alternator to the driving motive source. The block diagram circuit labeling corresponds with those described in Table One.

Of various models tested, the following are the highlights of one model. This working model of the Optimal Load Controller Method and Device comprises:

A Source of power

Electric motor: Central Machinery 6" Bench Grinder, Item # 39797, ½ Hp.115 V 60 Hz.3.5 A An electricity-generating device driven by the source of power.

Motorcraft 12 V 60 A generator/alternator driven by a ½ horsepower electric grinder motor.

A load to consume electrical power generated by the generating device.

The electrical load is an array of 5 * 50-watt automotive headlights.

The lights are in a parallel configuration and can be switched into the circuit or out of the circuit to vary the electrical load.

System adjusted to varied load.

Lights provide a visual feedback of power optimization.

A controller configured to use the following subsystems:

Load Engaging System: power transfer parameter engagement comprising:

Engine RPM Signal Circuit

On Off Circuit

Load Control Reset Circuit

Load Controller

TABLE THREE-continued

```
       Load Selecting System: power transfer parameter selection:
           Since this working system is optimizing only the variable
           load generator, one power transfer parameter, it does not
           require a Load Selection System.
       Load Optimizing System: power transfer parameter optimizing:
           Power Sensor Circuit, samples generated power
           Delay timing Circuit
           Power Comparator Circuit
           Logic Circuits: A and B
           Alternator Load Controller Circuit
System Configuration Illustrated in FIG. 7
Circuit Descriptions More detailed circuit functions are described in Table 1.
Parts General Power Supply (12 V and 5 V):
           Comp USA 300 Watt ATX Switching Power Supply, Model
           Number: KPw-5250F-ATX
       Circuit Supplies
           Integrated circuits: registers, comparators, counters,
           up/down counters, operational amplifiers, A/D converter,
           D/A converter, relays, 555 Timers, logic circuits
           Transistors, LEDs, infrared LED, infrared detector,
           resistors, breadboards
END TABLE THREE
```

This disclosure is provided to allow practice of the invention by those skilled in the art without undue experimentation, including the best mode presently contemplated and the presently preferred embodiment. Nothing in this disclosure or the accompanying diagrams is taken to limit the scope of the invention, which is susceptible to numerous alterations, equivalents and substitutions without departing from this scope and spirit of the invention. The scope of the invention is to be understood from the appended claims.

What is claimed is:

1. A controller configured to optimize generated power output by a power generation system thereby ensuring said power generation system efficiency wherein said power generation system comprises:

at least one source of power;

at least one load consuming energy from said source of power;

one or more power transfer parameters having values that can be increased or decreased and held constant by a transducer device operatively connected to said controller;

wherein said controller comprises the following operationally connected and structurally interrelated components:

a read write memory;

one or more of said transducer devices that can increase, decrease and hold a setting value of said one or more power transfer parameters and are responsive to said output result signals originating from a data processor;

an output power sensor operatively connected to a data processor, measures and captures indicated power output of said power generation system in a form recognizable by said data processor;

said data processor comprising logic circuitry configured to:

receive and process input data indicating system power output from a power output sensor, processing said input in accordance with instructions stored in its memory and producing output result signals;

select one power transfer parameter for optimization by one of said transducer devices and to hold other of said transducer devices, controlling the value of said power transfer parameter's settings, that are operatively connected to said power generation system for optimization by said controller, constant in their last setting, isolating said selected power transfer parameter for optimization;

optimize said power output by a power generation system by increasing or decreasing a setting value controlling said selected power transfer parameter's value as required to optimize said power generation system power output based on the power generating system's power output measurements obtained from said power output sensor;

function to iteratively optimize each of said one or more power transfer parameters operatively connected to said data processing system progressing from said selected power transfer parameter's setting to said next power transfer parameter selected for optimization;

produce said output result signals, based on processing said input by said logic circuitry, which are received by said one or more transducer devices independently controlling the values of said one or more power transfer parameters.

2. Said controller of claim 1, wherein said one or more power transfer parameters can be characterized as thermal, mechanical, electrical or chemical function/variable or as combinations thereof.

3. Said controller of claim 1, wherein a modification implemented by said data processor comprises increasing or decreasing a value related to said selected power transfer parameter value during an isolation phase.

4. Said controller of claim 1, wherein said processor continues to retrieve input from said power output sensor and to make dynamic modifications optimizing said generated power output by increasing or decreasing a value related to said selected power transfer parameter, changing its direction, thereby enabling said controller to adapt to changing conditions of said power generation system.

5. Said controller of claim 1 further comprises:

receiving and processing a signal indication said output power originating from said output power sensor;

selecting a power transfer parameter for optimization while holding other of said power transfer parameters, that are operatively connected to said power generation system for optimization by said controller, constant in their last setting;

controlling optimization of said power generation system's power output by increasing or decreasing a setting controlling the value of the selected power transfer parameter based on said indicated power output of said power generation system.

6. Said controller of claim 1 further comprises;

optimizing each power transfer parameter operatively connected to said controller progressing from the selected parameter to the next selected parameter; and holding other power transfer parameters constant in their last setting isolating said selected power transfer power transfer parameter being optimized by said load optimizing system.

7. Said controller of claim 1, wherein said controller can be iteratively operated to optimize said power transfer parameters.

8. Said controller of claim 1, optimizing system power output from the source of power, wherein said power transfer parameter selected for optimization value is increased or decreased by said controller based on the result of direction of output power, increasing or decreasing, implemented by comparing delayed power output measurements to more recent power output measurements originating from said power output sensor.

9. Said controller according to claim 1, wherein said data processor is operative to repeatedly optimize said selected power transfer parameter during operation of said power generation system.

10. Said controller of claim 1 further comprises setting a rate of change, increasing or decreasing, that is appropriate for the application of each individual power transfer parameter in said power generation system.

11. Said controller of claim 1 wherein said logic circuitry is operative to optimize said one or more power transfer parameters during operation of said power generation system.

12. A method operable by a controller to optimize generated output power by a power generation system thereby ensuring said power generation system efficiency wherein said method comprises the steps of:
providing a power generation system comprising:
at least one source of power;
at least one load consuming energy from said source of power;
one or more power transfer parameters having values that can be increased or decreased and held constant by a transducer device operatively connected to said controller;
providing said controller comprising the following operationally connected and structurally interrelated components:
a read write memory;
one or more of said transducer devices that can increase, decrease and hold a setting value of said one or more power transfer parameters and are responsive to said output result signals originating from a data processor;
an output power sensor operatively connected to said data processor, measures and captures indicated power output of said power generation system in a form recognizable by said data processor;
said data processor comprising logic circuitry configured to:
receive and process input data indicating system power output from a power output sensor, processing said input in accordance with instructions stored in its memory and producing output result signals;
select one power transfer parameter for optimization by one of said transducer devices and to hold other of said transducer devices, controlling the value of said power transfer parameter's settings, that are operatively connected to said power generation system for optimization by said controller, constant in their last setting, isolating said selected power transfer parameter for optimization;
optimize said power output by a power generation system by increasing or decreasing a setting value controlling said selected power transfer parameter's value as required to optimize said power generation system power output based on the power generating system's power output measurements obtained from said power output sensor;
function to iteratively optimize each of said one or more power transfer parameters operatively connected to said data processing system progressing from said selected power transfer parameter's setting to said next power transfer parameter selected for optimization;
produce said output result signals, based on processing said input by said logic circuitry, which are received by said one or more transducer devices independently controlling the values of said one or more power transfer parameters.

13. Said method of optimizing generated power output of a power generation system, according to claim 12, comprising the steps of
controlling a settings of said one or more power transfer parameters using said data processor;
said processor receiving data indicating said power output from said power output sensor;
said processor determining a direction of change of output power, increasing decreasing, by comparing a delayed output power measurement to a more recent power output measurement(s);
selecting one power transfer parameter for optimization by said processor;
varying the value of the selected power transfer parameter so as to optimize the transfer of power by either increasing or decreasing the value of the selected power transfer parameter based upon the result of the comparison of output measurements.

14. Said method of optimizing generated power output of a power generation system, according to claim 12, comprising the step of:
said processor continuing to retrieve input from said power output sensor and to make dynamic modifications optimizing said generated power output by increasing or decreasing a value related to said selected power transfer parameter, changing its direction, thereby enabling said controller to adapt to changing conditions of said power generation system.

15. Said method of optimizing generated power output of a power generation system, according to claim 12, comprising the steps of said controller:
receiving and processing a signal indication of power output of said power generation system;
selecting a power transfer parameter for optimization; while holding other of said power transfer parameters, that are operatively connected to said power generation system for optimization constant in their last setting;
controlling optimization of said power generation system's power output by increasing or decreasing a setting controlling the selected power transfer parameter's value based on the indicated power output of said power generation system.

16. Said method of optimizing generated power output of a power generation system, according to claim 12, comprising the steps of said controller:
iteratively optimizing each power transfer parameter operatively connected to said controller system product, progressing from the selected parameter to the next selected parameter; and
holding other power transfer parameters constant in their last setting, isolating said selected power transfer power transfer parameter being optimized by said load optimizing system.

17. Said controller of claim 12, wherein said controller can be iteratively operated to optimize power transfer parameters.

18. Said controller of claim 12 further comprises setting a rate of change, increasing or decreasing, that is appropriate for the application of each individual power transfer parameter in said power generation system.

19. Said controller of claim 12 wherein said logic circuitry is operative to optimize said one or more power transfer parameters during operation of said power generation system.

20. A computer program product stored in a computer readable, recordable-type medium and operable by a controller configured to optimize generated power output by a power generation system thereby ensuring said power generation system efficiency wherein said power generation system comprises:

at least one source of power;

at least one load consuming energy from said source of power;

one or more power transfer parameters having values that can be increased or decreased and held constant by a transducer device operatively connected to said controller;

wherein said controller comprises the following operationally connected and structurally interrelated components:

a read write memory;

one or more of said transducer devices that can increase, decrease and hold a setting value of said one or more power transfer parameters and are responsive to said output result signals originating from a data processor;

an output power sensor operatively connected to said data processor, measures and captures indicated power output of said power generation system in a form recognizable by said data processor;

said data processor comprising logic circuitry configured to:

receive and process input data indicating system power output from a power output sensor, processing said input in accordance with instructions stored in its memory and producing output result signals;

select one power transfer parameter for optimization by one of said transducer devices and to hold other of said transducer devices, controlling the value of said power transfer parameter's settings, that are operatively connected to said power generation system for optimization by said controller, constant in their last setting, isolating said selected power transfer parameter for optimization;

optimize said power output by a power generation system by increasing or decreasing a setting value controlling said selected power transfer parameter's value as required to optimize said power generation system power output based on the power generating system's power output measurements obtained from said power output sensor;

function to iteratively optimize each of said one or more power transfer parameters operatively connected to said data processing system progressing from said selected power transfer parameter's setting to said next power transfer parameter selected for optimization;

produce said output result signals, based on processing said input by said logic circuitry, which are received by said one or more transducer devices independently controlling the values of said one or more power transfer parameters.

21. Said program product of claim 20 comprises the following instructions:

instruction(s) for receiving and processing a signal indication of power output of said power generation system from said power output sensor, instruction(s) that selects a power transfer parameter for optimization while holding all other of said power transfer parameters, that are operatively connected to said power generation system for optimization by said controller, constant at their last setting value;

instruction(s) controlling optimization of said power generation system's power output by instructing to increase or decrease a setting controlling the selected power transfer parameter's value based on the indicated power output of said power generation system.

22. Said computer program product optimizing generated power output of said power generation system according to claim 20 further comprises:

said selection instruction(s) to iteratively optimize each power transfer parameter operatively connected to said controller system product, progressing from the selected parameter to the next selected parameter; and said selection instruction(s) holding other power transfer parameters constant at their last setting thereby effectively isolating said system power output, while said selected one power transfer parameter is optimized by said load optimizing system ensuring said power generation system efficiency.

23. Said computer program product optimizing generated power output of said power generation system according to claim 20 further comprises;

instructions to receive and process said indicated power measurements originating from said power output sensor;

instructions to determine the direction of change of said power output, increasing or decreasing, by comparing a stored value indicating said power output to a more recent value indicating said power output; and instructions to vary the selected power transfer parameter's value so as to optimize the transfer of power by either increasing or decreasing the power transfer parameter's value based upon the result of the comparison of said indicated power output values.

24. Said computer program product optimizing generated power output of said power generation system according to claim 20, wherein said instruction(s) are operative to optimize subsequently selected power transfer parameters during operation of said power generation system.

25. Said computer program product optimizing generated power output of said power generation system according to claim 20, wherein said instructions are operative to repeatedly optimize said selected power transfer parameter(s) during operation of said power generation system.

26. Said computer program product optimizing generated power output of said power generation system according to claim 20, wherein said instructions are operative to setting a rate of change, increasing or decreasing, that is appropriate for the application of each individual power transfer parameter in said power generation system.

27. Said computer program product optimizing generated power output of said power generation system according to claim 20, wherein said instructions is operative to optimize said one or more power transfer parameters during operation of said power generation system.

* * * * *